(12) United States Patent
Ishii et al.

(10) Patent No.: US 10,974,361 B2
(45) Date of Patent: Apr. 13, 2021

(54) METHOD FOR CORRECTING A POSITION OF A TIP OF A MACHINE TOOL

(71) Applicant: TOSHIBA KIKAI KABUSHIKI KAISHA, Tokyo (JP)

(72) Inventors: Yusuke Ishii, Shizuoka-ken (JP); Atsushi Tada, Shizuoka-ken (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 69 days.

(21) Appl. No.: 16/414,177

(22) Filed: May 16, 2019

(65) Prior Publication Data
US 2019/0321929 A1 Oct. 24, 2019

Related U.S. Application Data

(62) Division of application No. 15/398,292, filed on Jan. 4, 2017.

(30) Foreign Application Priority Data

Jan. 7, 2016 (JP) .................................. 2016-001945
Dec. 14, 2016 (JP) .................................. 2016-242627

(51) Int. Cl.
*B23Q 17/24* (2006.01)

(52) U.S. Cl.
CPC ..... *B23Q 17/2428* (2013.01); *B23Q 17/2485* (2013.01); *B23Q 17/2419* (2013.01)

(58) Field of Classification Search
CPC ............ B23Q 17/2423; B23Q 17/2428; B23Q 17/2457; B23Q 17/2485; B23Q 17/2419; B23Q 17/2461; B23Q 16/12; B23Q 15/24
See application file for complete search history.

(56) References Cited

U.S. PATENT DOCUMENTS 4,966,460 A * 10/1990 Kahley ............. B23Q 17/2457
356/640
8,950,987 B2 2/2015 Okada
(Continued)

FOREIGN PATENT DOCUMENTS

DE 19851411 5/2000
DE 102005026375 A1 * 12/2006 ......... B23Q 17/2485
(Continued)

OTHER PUBLICATIONS

Japanese Office Action issued in JP Application No. 2016-242627 dated Oct. 2, 2020.

*Primary Examiner* — Ryan C Rufo
(74) *Attorney, Agent, or Firm* — DLA Piper LLP US

(57) ABSTRACT

A machine tool includes a mounting table, a tool, a shade detector, and a tool controller. A workpiece is placed on the mounting table. The tool includes a tip. The shade detector is fixed on the mounting table, provides an optical path of a laser light, and detects a shade state of the laser light. The tool controller is connected to the mounting table via a supporting structure and controls an orientation and a position of the tool. A reference point associated with the tool is provided to the tool controller. The tool controller corrects a position of the tip based on a difference between a position obtained by calculation of the reference point in the case where the tip is matched with a measurement position P of a laser light and a position of the reference point when the tip portion is actually matched with a measurement position while keeping the orientation of a tool.

3 Claims, 22 Drawing Sheets

(56) References Cited

U.S. PATENT DOCUMENTS

| | | |
|---|---|---|
| 2006/0020422 A1 | 1/2006 | Ashton |
| 2009/0244550 A1* | 10/2009 | Fujishima ............ G05B 19/402 |
| | | 356/614 |
| 2012/0085893 A1 | 4/2012 | Miyamoto |
| 2018/0281142 A1* | 10/2018 | Ketelaer .................. G01H 9/00 |

FOREIGN PATENT DOCUMENTS

| | | | |
|---|---|---|---|
| DE | 10 2005 043659 | 3/2007 | |
| DE | 202014100965 U1 * | 6/2015 | ......... B23Q 17/2485 |
| FR | 2928289 | 9/2009 | |
| GB | 1169345 A * | 11/1969 | ............ B23Q 15/24 |
| JP | 10138097 | 5/1998 | |
| JP | 2012-18093 | 1/2012 | |
| JP | 2013-202720 A | 10/2013 | |
| WO | WO-0059677 A1 * | 10/2000 | ......... B23Q 17/2485 |

* cited by examiner

METHOD FOR CORRECTING A POSITION OF A TIP OF A MACHINE TOOL

CROSS-REFERENCE TO RELATED APPLICATIONS

The present application is a continuation of application Ser. No. 15/398,292 filed Jan. 4, 2017, which is based on Japanese Patent Application Nos. 2016-001945 filed Jan. 7, 2016 and 2016-242627 filed Dec. 14, 2016 to obtain benefits of the applications. The contents of each are incorporated herein by reference in their entirety.

BACKGROUND OF THE INVENTION

Field of the Invention

The present invention relates to a machine tool which performs machining to a workpiece placed on a mounting table by relatively moving a tool. Alternatively, the present invention relates to a method for correcting a position of a tip of the machine tool.

Background Art

Conventionally, a curved surface is formed on a surface of a workpiece, for example, by using ball end mill. In the machining, in addition that a used-up tool is exchanged for a same-diameter and a same type tool, a tool may be exchanged for other tool having a different edge diameter according to a curvature radius and a machining position of a targeted curved surface. In this case, desirably, a curved surface formed by a tool before exchange and a curved surface formed by a tool after exchange are smoothly connected. Therefore, it is necessary to accurately align a position of a tip of the tool before exchange and a position of a tip of the tool after exchange in consideration of an orientation change (orientation error) of a machine tool at the point.

A position of a tip of the tool is generally evaluated based on an extending direction (orientation) of a tool and a length of the tool, for example, as described in JP 10-138097 A and JP 2012-18093 A. Specifically, a machine tool includes a shade detector which can provide an optical path of a laser light and detect a shade state of the laser light, a tip of the tool is moved from a predetermined position to the optical path of a laser light, and the laser light is shaded at the tip. The shade detector outputs a skip signal to a controller of a machine tool when shading is started. When the controller receives the skip signal, tool movement is stopped, and a length of the tool is evaluated based on a movement distance from the predetermined position.

Then, for example, in the case where a tool is exchanged, before the tool restarts machining to a workpiece, a tool position after exchange is determined, based on a difference between lengths of the tool before and after exchange, such that a position of a tip of the tool before exchange and a position of a tip of the tool after exchange are matched. The measurement is assumed that a machine tool does not have an orientation error in a space, and a length of the tool just indicates a shift amount of a reference point of the machine too, and therefore the measurement may not be performed on the machine tool. For example, a length of the tool may be previously measured by using such as a tool presetter.

However, even in the case where a position of a tool is determined after a length of the tool is accurately evaluated, a slight difference is caused between positions of a tip of the tool before and after exchange, and a curved surface formed by a tip of the tool before exchange and a curved surface formed by a tip of the tool after exchange may not be smoothly connected (a level difference is caused). Such the difference is caused mainly since, in a series of components from a mounting table on which a workpiece is placed to a main axis, an orientation change (orientation error) of a machine tool by an error caused by thermal deformation by a temperature change in work environment becomes apparent as a step on a machined surface accompanying a tool exchange. Especially, the difference is remarkable in a coordinate system including rotations of orthogonal three axes in comparison with a coordinate system of the orthogonal three axes.

SUMMARY OF THE INVENTION

An inventor of the present invention has found that a position of a tip of a tool after an orientation change or after exchange can be positioned with reproducibility by directly evaluating a position of a tip of the tool even in the case where an orientation change (orientation error) of a machine tool is caused by an error caused to a series of components from a mounting table on which a workpiece is placed to a tool.

The present invention is originated based on the above-described knowledge. An object of the present invention is to provide a machine tool and a method for correcting a position of a tip of the tool. By directly evaluating a position of the tip in a state in which the above-described orientation error of a machine tool is included, in a state in which the orientation error is included, the machine tool can actually match a position of the tip before an orientation change or before exchange and a position of the tip after an orientation change or after exchange and smoothly connect a curved surface formed without considering the orientation error.

In the present invention, a machine tool includes:
a mounting table on which a workpiece is placed;
a tool configured to machine the workpiece placed on the mounting table, the tool including a tip;
a shade detector fixed on the mounting table and configured to provide an optical path of a laser light and detect a shade state of the laser light; and
a tool controller connected to the mounting table via a supporting structure and configured to control an orientation and a position of the tool,
wherein a reference point associated with the tool is provided to the tool controller, and
based on a first orientation, which is an orientation of the tool for machining, and on a length of the tool, the tool controller specifies a first tool position which is a position of the reference point in a state in which the tip is actually matched with a measurement position of the laser light, while keeping the first orientation.

According to the present invention, a position of the tip of the tool before an orientation change or before exchange can be accurately specified in a state in which an orientation error of a machine tool is included. Therefore, a position of the tip of the tool after the orientation change or after the exchange can be accurately matched with the position. As a result, it is possible to provide a machine tool which can smoothly connect formed curved surfaces without considering the orientation error.

The machine tool wherein, when the tool is moved in one axial direction while the tool controller keeps the first orientation of the tool, the first tool position is determined based on a position of the reference point in a state in which the measurement position of the laser light is shaded in a first portion of the tool and a position of the reference point in a state in which the measurement position of the laser light is shaded in a second portion of the tool when the tool is moved in said axial direction.

The tool controller controls a position of the tool such that the reference point is positioned on a straight line connecting the measurement position of the laser light and a central point of the line defined by the above-described two positions, while keeping the first orientation of the tool, the tool controller moves the tool such that the reference point is along said straight line, while keeping the first orientation of the tool, and the first tool position is determined based on a position of the reference point in a state in which the measurement position is shaded by the tip when the tool is moved along the straight line.

In these cases, a position of the tip can be accurately specified in a state in which an orientation error caused to a machine tool is included.

In the present invention, when an orientation of the tool is changed from the first orientation to a second orientation, the tool controller, based on the second orientation and the length of the tool, specifies a second tool position which is a position of the reference point in a state in which the tip is actually matched with the measurement position of the laser light, while keeping the second orientation, and the tool controller corrects a position of the tip in the second orientation of the tool based on a difference between the first tool position and the second tool position.

In this case, in a state in which an orientation error is included, both of a position of the tip before an orientation change and a position of the tip after the orientation change can be accurately specified. Therefore, the both positions can be easily matched with accuracy.

Alternatively, in the present invention, when the tool is exchanged for other tool, the tool controller, based on the first orientation and a length of the other tool, specifies a third tool position which is a position of the reference point in a state in which a tip of the other tool is actually matched with the measurement position of the laser light, while keeping the first orientation, and the tool controller corrects a position of the tip in the first orientation of the other tool based on a difference between the first tool position and the third tool position.

In this case, in a state in which an orientation error is included, both of a position of the tip before exchange and a position of the tip after exchange can be accurately specified. Therefore, the both positions can be easily matched with accuracy.

The tool controller may perform five-axis control of the tool. In this case, an orientation and a position of the tip can be freely controlled.

An example of the tool used in the machine tool includes a ball end mill.

A method for correcting a position of a tip of the above-described machine tool is also a protection target of the present application. That is, the present invention provides a method for correcting a position of a tip of a machine tool, wherein the machine tool includes:

a mounting table on which a workpiece is placed;

a tool configured to machine the workpiece placed on the mounting table, the tool including a tip;

a shade detector fixed on the mounting table and configured to provide an optical path of a laser light and detect a shade state of the laser light; and a tool controller connected to the mounting table via a supporting structure and configured to control an orientation and a position of the tool, wherein a reference point associated with the tool is provided to the tool controller, and the correction method includes:

a matching process in which the tool controller actually matches the tip of the tool with a measurement position of the laser light, while keeping a first orientation which is an orientation of the tool for machining, the matching being based on the first orientation and a length of the tool; and a first tool position specifying process in which a first tool position, which is a position of the reference point in a state in which the tip is actually matched with the measurement position of the laser light, is specified.

According to the present invention, a position of the tip before an orientation change or before exchange can be accurately specified in a state in which an orientation error of a machine tool is included. Therefore, a position of the tip after the orientation change or after the exchange can be accurately matched with the position. As a result, a method for correcting a position of the tip can be provided which can smoothly connect formed curved surfaces without considering the orientation error.

The matching process can include:

a first moving process in which the tool controller moves the tool in one axial direction while keeping the first orientation; and a specifying process in which the tool controller specifies, in the first moving process, a position of the reference point in a state in which the measurement position of the laser light is shaded in a first portion of the tool and a position of the reference point in a state in which the measurement position of the laser light is shaded in a second portion of the tool when the tool is moved in said axial direction.

Further, the specifying process can include:

a process configured so that the tool controller controls a position of the tool such that the reference point is positioned on a straight line connecting the measurement position of the laser light and a central point of the line defined by the above-described two positions, while keeping the first orientation of the tool and moving the tool such that the reference point is positioned along the straight line while keeping the first orientation of the tool; and a process so that the tool controller specifies a position of the reference point in a state in which the measurement position is shaded by the tip when the tool is moved along the straight line.

In these cases, a position of the tip can be accurately specified in a state in which an orientation error caused to a machine tool is included. Therefore, the position of the tip can be accurately corrected.

The above-described correction method can further include:

a second tool position specifying process in which, when an orientation of the tool for machining is changed from the first orientation to a second orientation, the tool controller, based on the second orientation and the length of the tool, specifies a second tool position which is a position of the reference point in a state in which the tip of the tool is actually matched with the measurement position of the laser light, while keeping the second orientation, and a second tool position correcting process in which a position of the tip in the second orientation of the tool is corrected based on a difference between the first tool position and the second tool position.

In this case, in a state in which an orientation error is included, both of a position of the tip before an orientation change and a position of the tip after the orientation change can be accurately specified. Therefore, the both positions can be easily matched with accuracy.

Alternatively, the above-described correction method can further includes:

a third tool position specifying process in which, when the tool is exchanged for other tool, the tool controller, based on the first orientation and a length of the other tool, specifies a third tool position which is a position of the reference point in a state in which a tip of the other tool is actually matched with the measurement position of the laser light, while keeping the first orientation, and a third tool position correcting process in which a position of the tip in the first orientation of the other tool is corrected by the tool controller based on a difference between the first tool position and the third tool position.

In this case, in a state in which an orientation error is included, both of a position of the tip before exchange and a position of the tip after exchange can be accurately specified. Therefore, the both positions can be easily matched with accuracy.

According to the present invention, a position of the tip of a tool before an orientation change or before exchange can be accurately specified in a state in which an orientation error of a machine tool is included. Therefore, a position of the tip of the tool after the orientation change or after the exchange can be accurately matched with the position. As a result, it is possible to provide a machine tool which can smoothly connect formed curved surfaces without considering the orientation error.

Alternatively, according to the present invention, a position of the tip of a tool before an orientation change or before exchange can be accurately specified in a state in which an orientation error of a machine tool is included. Therefore, a position of the tip of the tool after the orientation change or after the exchange can be accurately matched with the position. As a result, a method for correcting a position of the tip can be provided which can smoothly connect formed curved surfaces without considering the orientation error.

DETAILED DESCRIPTION OF THE INVENTION

An embodiment of the present invention will be described below with reference to attached drawings.

Figure 1:
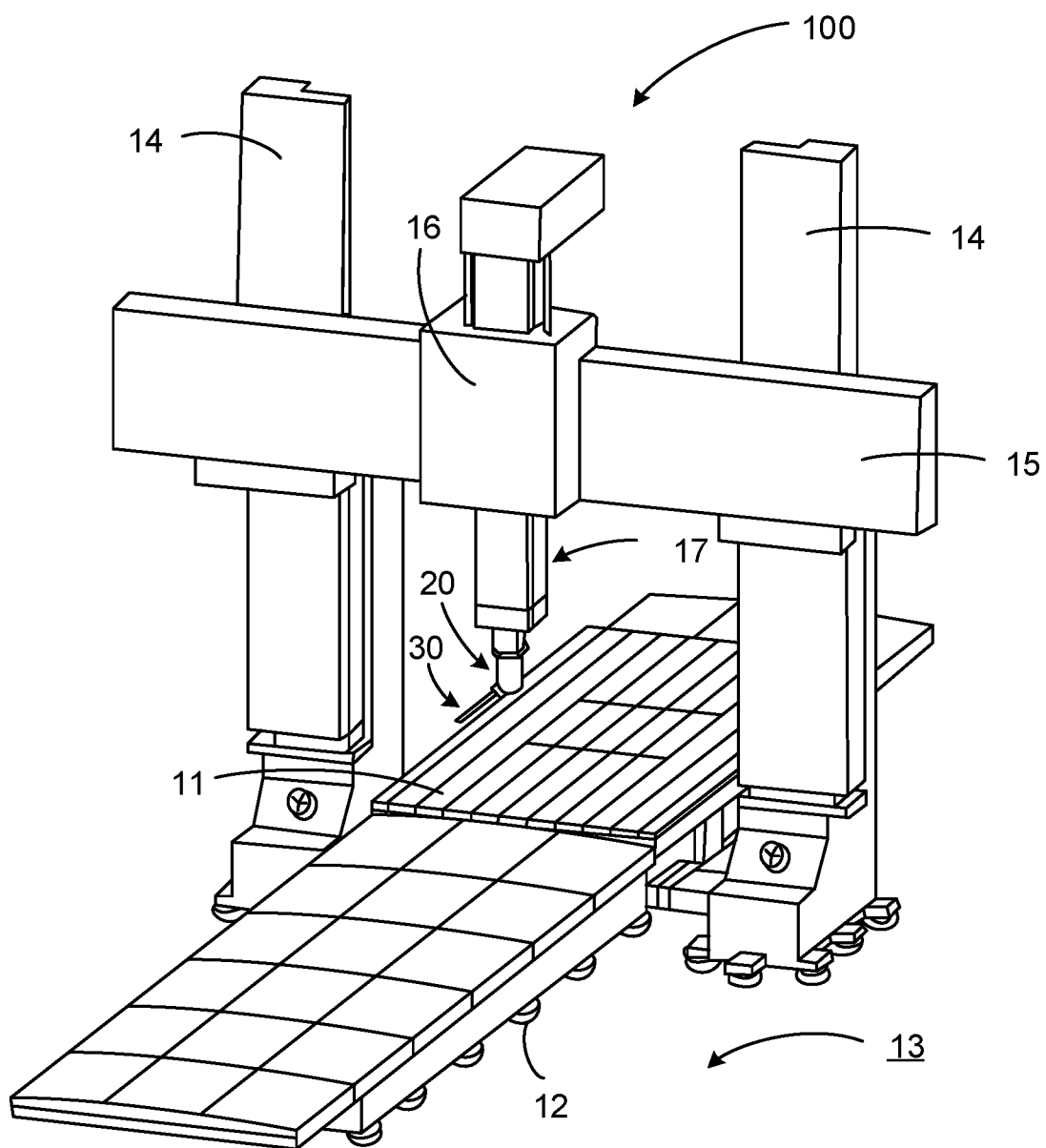
FIG. 1 is a schematic perspective view of a machine tool according to a first embodiment of the present invention.
Figure 1:
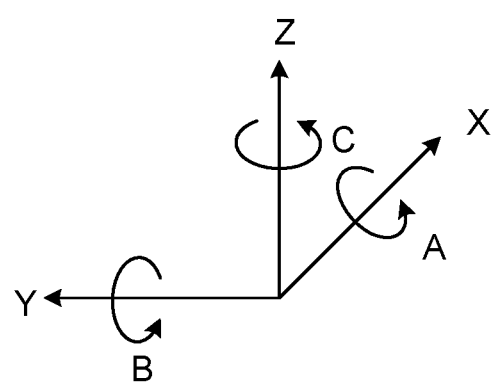
Figure 2:
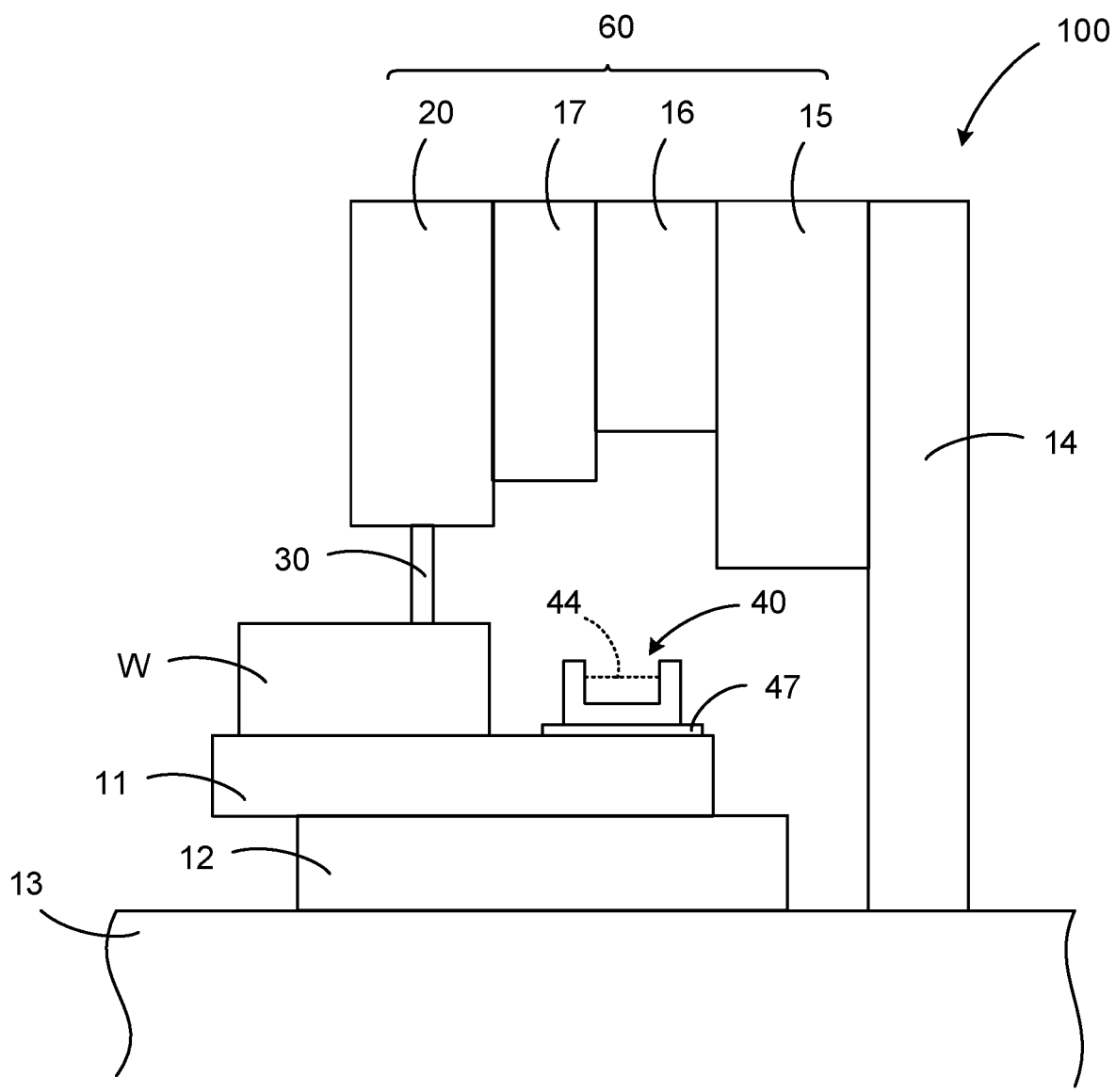
FIG. 2 is a view schematically illustrating a series of components of the machine tool illustrated in FIG. 1.

FIG. 1 is a schematic perspective view of a machine tool 100 according to the embodiment of the present invention. FIG. 2 is a view schematically illustrating a series of components of the machine tool 100 illustrated in FIG. 1. As illustrated in FIG. 1, the machine tool 100 according to the embodiment is a gate-shaped processing machine. As illustrated in FIGS. 1 and 2, the gate-shaped processing machine includes a table 11, a bed 12, a foundation 13, a pair of columns 14, and a driving unit 60. A workpiece W is placed on the table 11. The bed 12 supports the table 11. The foundation 13 supports the bed 12. A pair of the columns 14 is fixed on the foundation 13 and extends in a vertical upper direction in parallel with each other at a position sandwiching the bed 12. The driving unit as a tool controller is supported by a pair of the columns 14 and controls an orientation of a tool holding portion to be described later and a position of a reference point provided at a tip of the tool holding portion (refer to FIG. 2).

The driving unit 60 according to the embodiment is controlled by a controller 50 to be described later (refer to FIG. 5). The driving unit 60 includes a cross rail 15, a saddle 16, a ram 17, and an index head 20. The cross rail 15 is vertically movably hung between a pair of the columns 14. The saddle 16 is supported movably in a horizontal direction (a Y axis direction in FIG. 1) with respect to the cross rail 15, and a through hole extending in a vertical direction is formed in the saddle 16. The ram 17 is supported in the through hole of the saddle 16 and is slidable in a vertical direction in the through hole. The index head 20 is engaged in a lower end area of the ram 17 and includes a tool holding portion 21 which rotatably holds the tool 30 to be described later. The driving unit 60 according to the embodiment includes a known driving mechanism of such as a motor. The cross rail 15, the ram 17, and the index head 20 are driven by the driving mechanism.

As illustrated in FIG. 2, the index head 20 according to the embodiment is supported by the ram 17 so as to face with the table 11. The index head 20 controls an orientation (direction) of the tool 30 or the tool holding portion 21 based on a previously set device coordinate system (refer to FIG. 1) and a machining program. This control is performed based on a coordinate value in the device coordinate system of the reference point 22 (refer to FIG. 3) previously set to a tip of the tool holding portion 21. The reference point 22 according to the embodiment is placed on an axial line of the tool 30 mounted to the tool holding portion 21.

Figure 3:
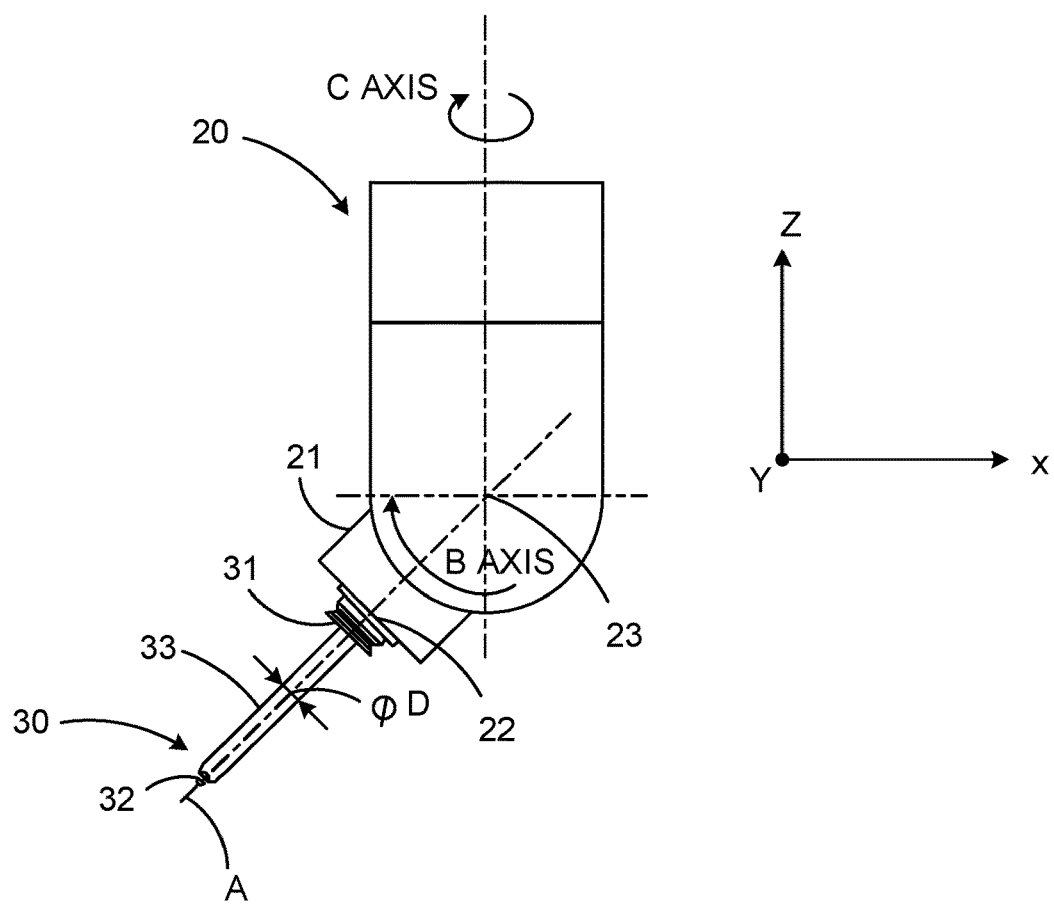
FIG. 3 is a schematic elevation view of an index head including a tool of the machine tool illustrated in FIG. 1.

FIG. 3 is a schematic elevation view of the index head 20 of the machine tool 100 illustrated in FIG. 1 and illustrates a state in which the tool 30 is mounted to the tool holding portion 21. As illustrated in FIG. 3, the index head 20 according to the embodiment can perform five-axis control (control regarding X, Y, Z, B, and C axes in FIG. 3). Regarding rotation control in a vertical surface (control regarding the B axis in FIG. 3), the tool holding portion 21 can be rotated clockwise around a rotation center 23 within an angle range of 0° to 95° with respect to a vertical axial line in a vertical lower direction. An angle per 1° can be calculated in this rotation.

Further, as illustrated in FIG. 3, the tool 30 according to the embodiment is ball end mill and includes a portion to be held 31, a tip area, and a same-diameter cylindrical portion 33. The portion to be held 31 is held by the tool holding portion 21. The tip area has a hemispherical shape and includes an edge for cutting a workpiece W. The same-diameter cylindrical portion 33 is provided between the portion to be held 31 and the tip area. As illustrated in FIG. 3, the hemispherical tip area includes a tip 32 at a position where the tip area and an axial line A of the same-diameter cylindrical portion 33 are crossed. A length of the tool 30 is previously measured by a tool presetter before the tool 30 is mounted to the machine tool 100, and the measurement result (length of the tool) is recorded in a control unit 51 of the controller 50 to be described later.

Figure 4:
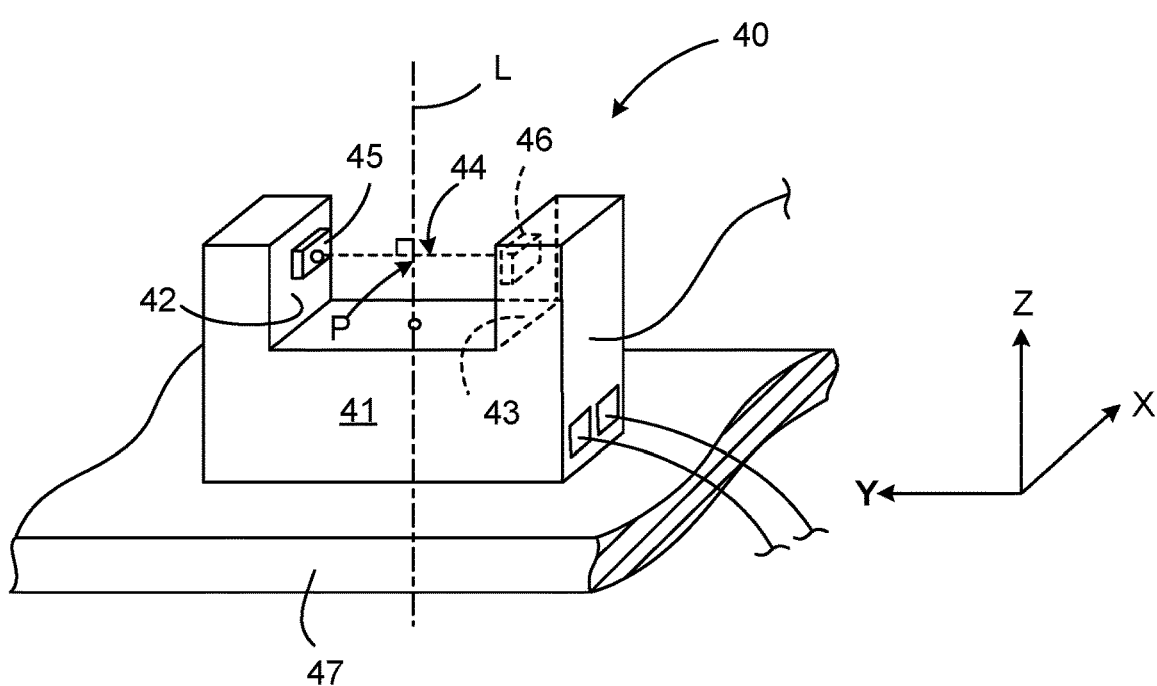
FIG. 4 is a schematic perspective view of a shade detector used in the machine tool illustrated in FIG. 1.

In FIG. 2, the machine tool 100 according to the embodiment further includes the shade detector 40 fixed on a rotary table 47. FIG. 4 indicates a schematic perspective view of the shade detector 40. As illustrate in FIG. 4, the shade detector 40 according to the embodiment includes a pair of facing walls 42 and 43 provided at predetermined intervals on a rectangular parallelepiped foundation 41 and an upper surface of the foundation 41, and the shade detector 40 has a recessed shape as a whole. One side wall (the left side wall in FIG. 4) 42 includes a light emitting unit 45 which emits a laser light 44 toward another wall (the right side wall in FIG. 4). Another wall 43 includes a light receiving unit 46 which receives the laser light 44. Then, when a state is changed from a state in which the light receiving unit 46 receives the laser light 44 to a state in which a certain percentage or more of the laser light 44 is shaded, a skip signal is issued to the controller 50.

As illustrated in FIG. 4, the rotary table 47 is rotated in a form in which a rotation center axis L of the rotary table 47 and an optical path of the laser light 44 are orthogonal to each other. In other words, the rotation center axis L of the shade detector 40 is also orthogonal to the optical path of the laser light 44. Further, an intersection between a rotation center axis of the rotary table 47, specifically the rotation center axis L of the shade detector 40, and the laser light 44 is a measurement position P to be measured by the shade detector 40.

Figure 5:
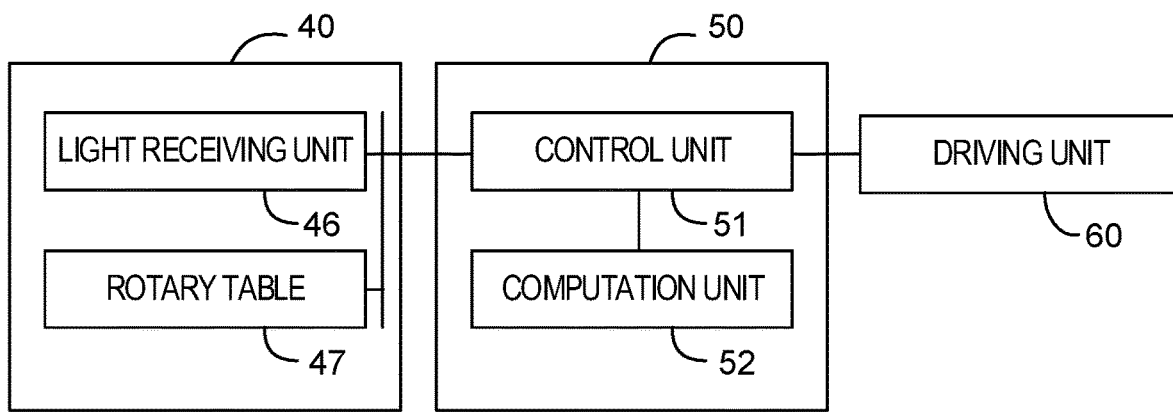
FIG. 5 is a block diagram illustrating a connection relation of a controller, a shade detector, and a driving unit of the machine tool illustrated in FIG. 1.

FIG. 5 is a block diagram illustrating a connection relation of the controller 50, the shade detector 40, and the driving unit 60 of the machine tool 100 illustrated in FIG. 1. As illustrated in FIG. 5, the controller 50 according to the embodiment includes a control unit 51 and a computation unit 52. The control unit generates a control signal to control an orientation of the tool 30 or the tool holding portion 21 and a position of the reference point 22 based on a previously recorded machining program and sends the control signal to the driving unit 60. The computation unit 52 is connected to the control unit 51 and obtains a coordinate value in a device coordinate system of the reference point 22 when the tool 30 or the tool holding portion 21 are moved by the driving unit 60, and the tool 30 shades a certain percentage of the laser light 44.

As illustrated in FIG. 5, the control unit 51 according to the embodiment is connected to the driving unit 60, and the cross rail 15, the ram 17, and the index head 20 are driven based on an instruction from the control unit 51, and a position of the tool 30 with respect to the workpiece W is determined. In addition, as illustrated in FIG. 5, the above-described shade detector 40 is connected to the control unit 51, and the computation unit 52 obtains, from the control unit 51, a coordinate value of the reference point 22 when the control unit 51 receives a skip signal. When the tool 30 is measured, the rotary table 47 is rotated by the control unit 51, and a position of the shade detector 40 with respect to the tool 30 is determined. In the machine tool 100 according to the embodiment, a coordinate value of an optical path of the laser light 44 is previously stored in the control unit 51, and a relative positional relation between the reference point 22 of the tool holding portion 21 and an optical path of the laser light 44 is recognized by the controller 50.

Further, the driving unit 60 is moved in one axial direction (for example, the Z axis direction in FIG. 3) of a device coordinate system of the tool 30 based on a previously obtained coordinate value of an optical path of the laser light 44 and a relative positional relation between the reference point 22 of the tool holding portion 21 and the same-diameter cylindrical portion 33, such that the same-diameter cylindrical portion 33 interrupts the laser light 44 while keeping a predetermined orientation of the tool 30. In the present description, a coordinate value of an optical path of the laser light 44 means a coordinate value in a device coordinate system of the above-described measurement position P. The control unit 51 of the controller 50 obtains and controls a coordinate value in the device coordinate system of the measurement position P.

Figure 15:
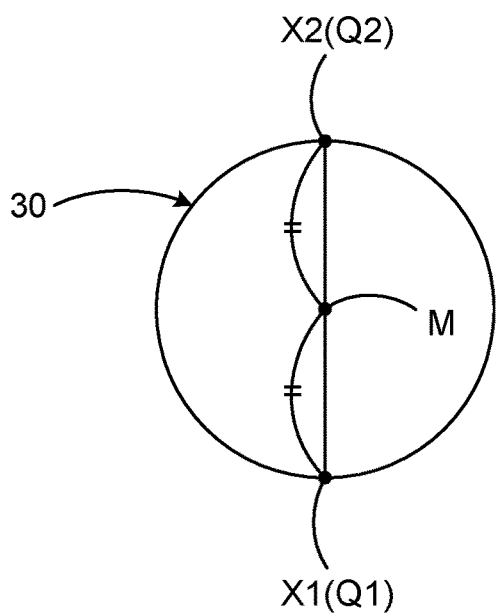
FIG. 15 is a view to describe a process to determine an actual position of a tip of the tool while keeping an orientation of the tool for machining and is a view to describe a process to specify an axial line of a tool.

When the tool 30 is moved, the computation unit 52 according to the embodiment specifies a central point M of the line defined by a first coordinate value Q1 in a device coordinate system of the reference point 22 in a state in which the laser light 44 contacts at a first position X1 of the same-diameter cylindrical portion 33 and a second coordinate value Q2 in the device coordinate system of the reference point 22 in a state in which the laser light 44 contacts at a second position X2 of the same-diameter cylindrical portion 33 (refer to FIG. 15). According to the embodiment, the first position X1 and the second position X2 correspond to each of a plane specified by a direction of an optical path of the laser light 44 and a vertical direction of the laser light 44 and a lower end portion and an upper end portion of a portion (elliptic sectional surface) shared with the same-diameter cylindrical portion 33.

The controller 50 according to the embodiment controls a position of the reference point 22 via the driving unit 60 such that the reference point 22 is positioned on a straight line connecting the measurement position P and the central point M of the shade detector while keeping the predetermined orientation, and the reference point 22, specifically the tool 30, is moved along the straight line while keeping the predetermined orientation. During this movement, the computation unit 52 obtains a coordinate value in a device coordinate system of the reference point 22 to shade a certain percentage of the laser light 44 when the tip 32 of the tool 30 reaches to the laser light 44.

Next, the machine tool 100 according to the embodiment will be described.

Figure 6:
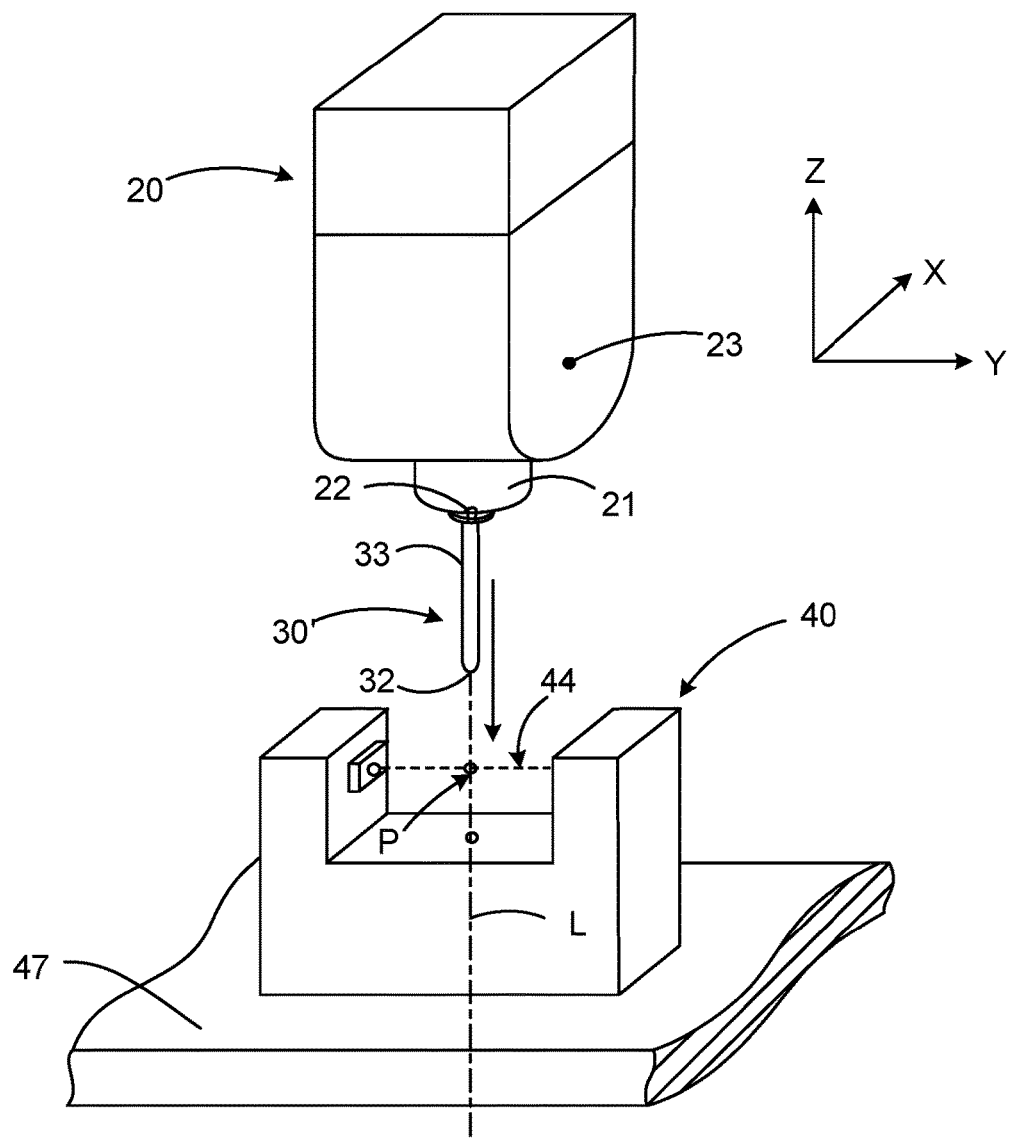
FIG. 6 is a schematic perspective view to describe a process to specify a reference point of the machine tool illustrated in FIG. 1 by using a reference tool.
Figure 7A:
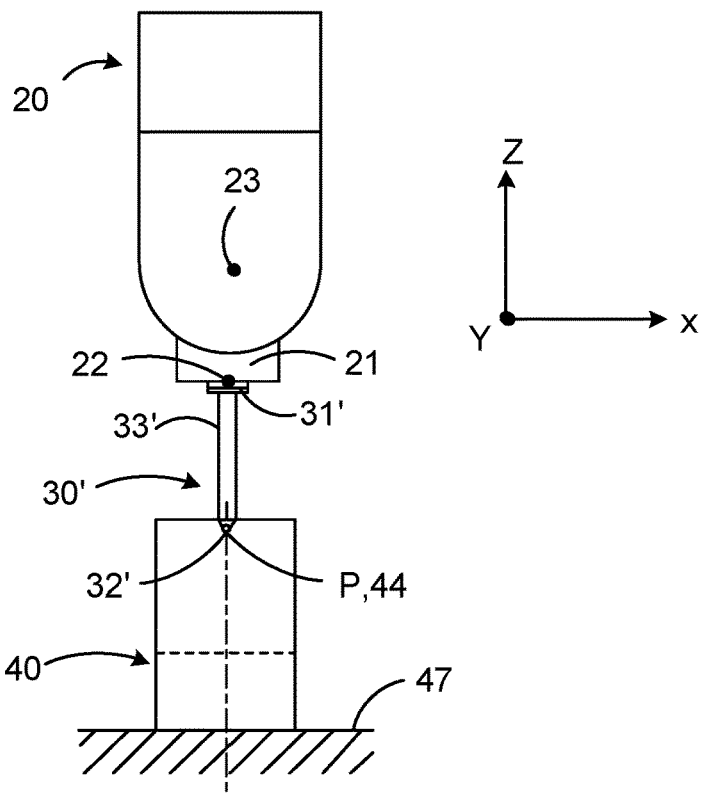
FIG. 7A is a schematic side view to describe the process to specify the reference point of the machine tool illustrated in FIG. 1 by using the reference tool.
Figure 7B:
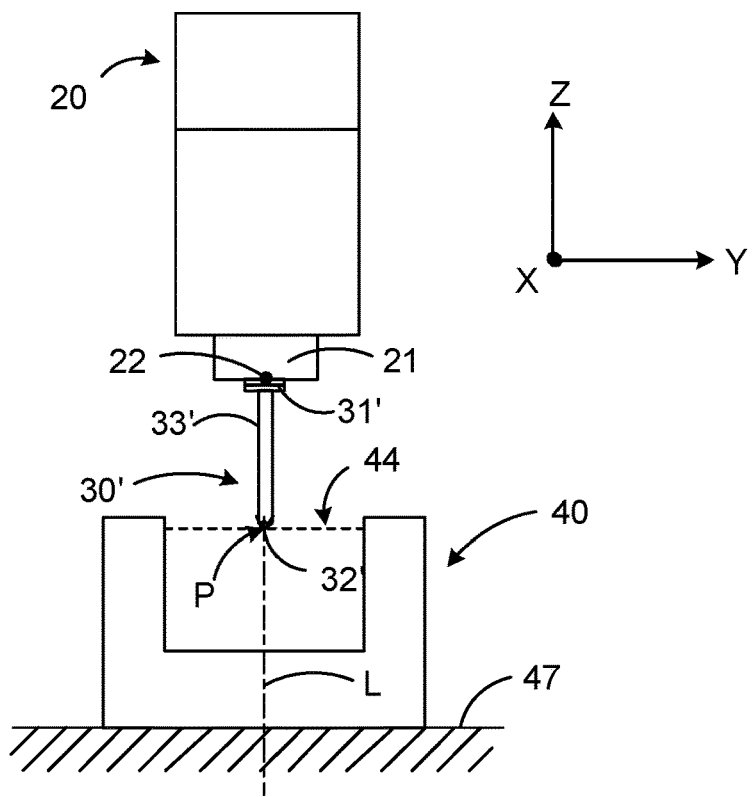
FIG. 7B is a schematic elevation view to describe the process to specify the reference point of the machine tool illustrated in FIG. 1 by using the reference tool.

A process to set a coordinate value in a device coordinate system of the reference point 22 which is a calibration process of the machine tool 100 according to the embodiment will be described first with reference to FIGS. 6 to 7B, prior to describing a measurement procedure of the tool 30. FIGS. 6 to 7B are views to describe a process to specify the reference point 22 of the machine tool 100 illustrated in FIG. 1 by using a reference tool 30'. FIG. 6 is a schematic perspective view of the process. FIG. 7A is a schematic side surface view, and FIG. 7B is a schematic elevation view.

In illustrated examples, the reference tool 30' is held by the tool holding portion 21 in a reference orientation in which every angles of a B axis/a C axis illustrated in FIG. 6 are 0°. Here, the reference tool 30' means a tool which can accurately specify a length (a distance from the reference point 22 to the tip 32'). A length of the reference tool 30' is previously input to the control unit 51 of the controller 50 and grasped by the control unit 51.

Further, as illustrated in FIGS. 7A and 7B, the index head 20 is parallely moved in one axial direction (for example, a vertical direction) by the driving unit 60, and the measurement position P of the laser light 44 is shaded by the tip 32' of the reference tool 30'. According to the embodiment, the controller 50 obtains and controls a coordinate value in the device coordinate system of the reference point 22. A parallel movement of the index head 20 is controlled based on a coordinate value in the device coordinate system of the reference point 22 and the measurement position P of the laser light 44 stored in the controller 50. When the tip 32' of the reference tool 30' shades a certain percentage of the laser light 44, the shade detector 40 sends a skip signal to the control unit 51 of the controller 50. The control unit 51 which has received the skip signal causes the computation unit 52 to obtain a coordinate value of the reference point 22 as of when the skip signal has been received. This coordinate value is sent from the computation unit 52 to the control unit 51, and the coordinate value is stored in the control unit 51 as a reference coordinate value (an original point of the device coordinate system) of the reference point 22 in a state in which the tip 32' is positioned at the measurement position P.

A procedure to correct a position (coordinate value) of the tip 32 of the tool 30 in a state in which an orientation error of the machine tool 100 is included will be described next with reference to FIGS. 8A to 16B.

Figure 8:
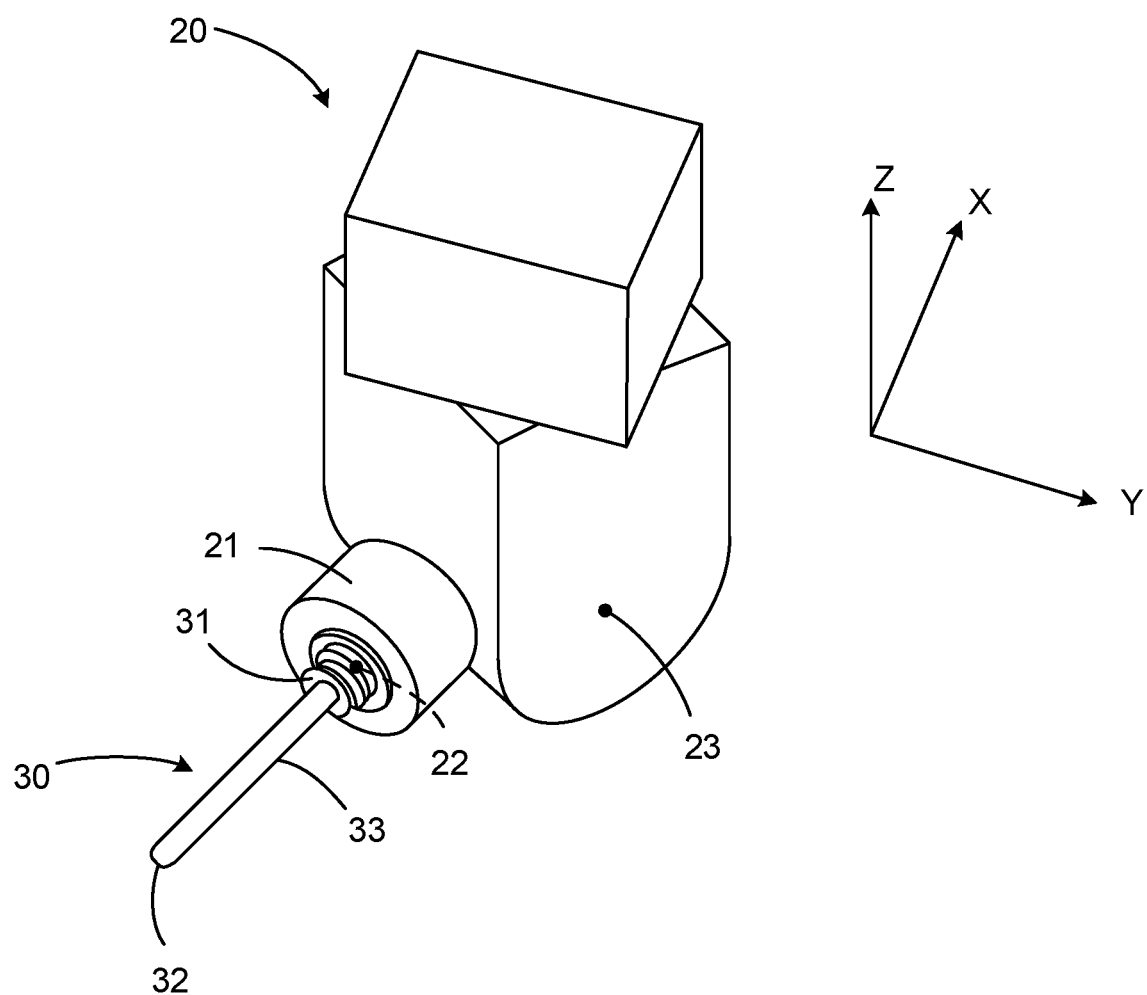
FIG. 8 is a view to describe a process to determine an actual position of a tip of the tool while keeping an orientation of the tool for machining and is a schematic elevation view illustrating a tool just before the process is started.
Figure 16A:
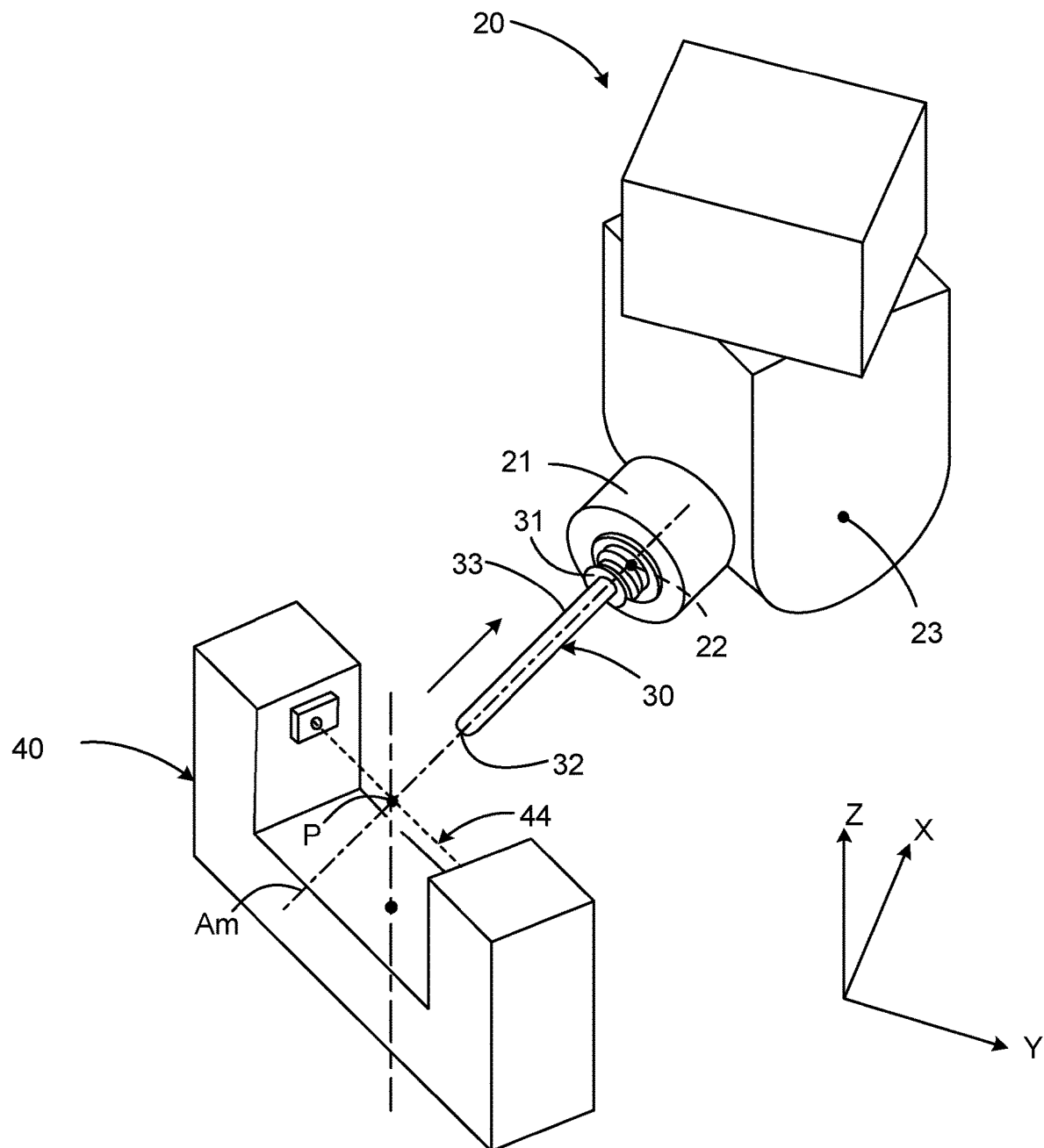
FIG. 16A is a view to describe a process to determine an actual position of a tip of the tool while keeping an orientation of the tool for machining and is a schematic perspective view illustrating a process to move a tool such that a measurement position of a shade detector is positioned on an axial line of the tool.
Figure 16B:
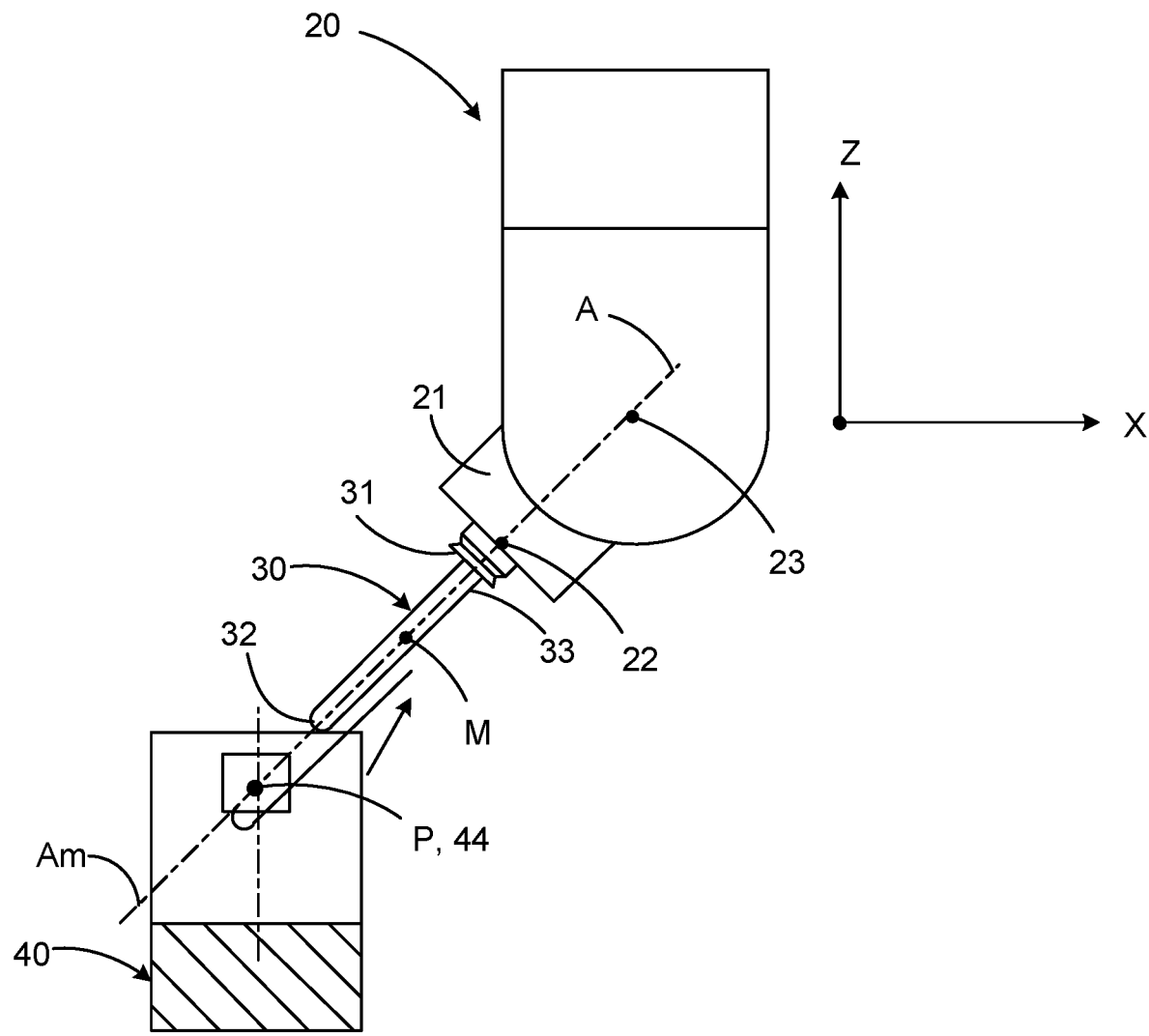
FIG. 16B is a schematic side view of FIG. 16A.
Figure 17A:
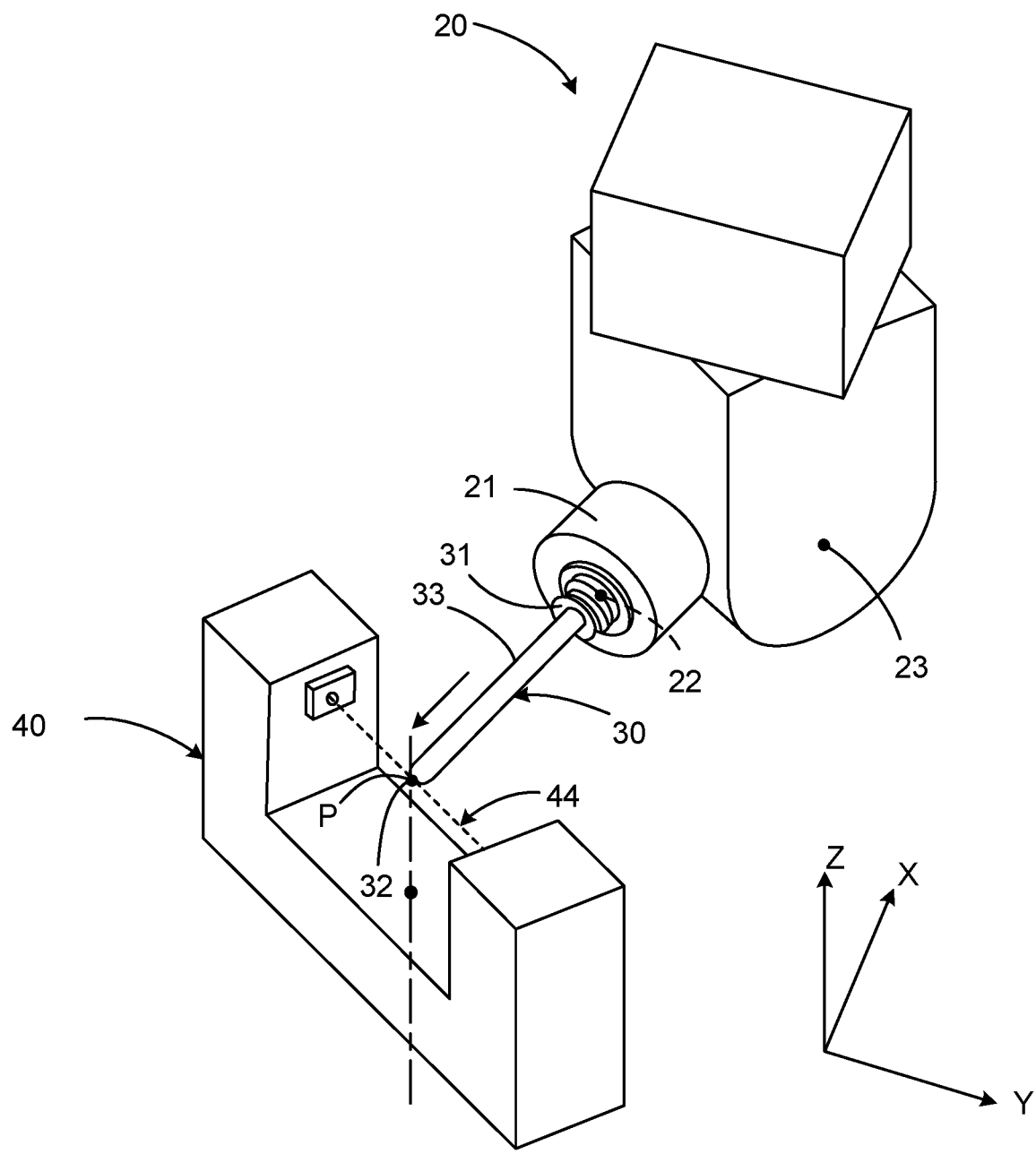
FIG. 17A is a view to describe a process to determine an actual position of a tip of the tool while keeping an orientation of the tool for machining and is a schematic perspective view illustrating a process to linearly move a tool toward a measurement position along an axial line of the tool.
Figure 17B:
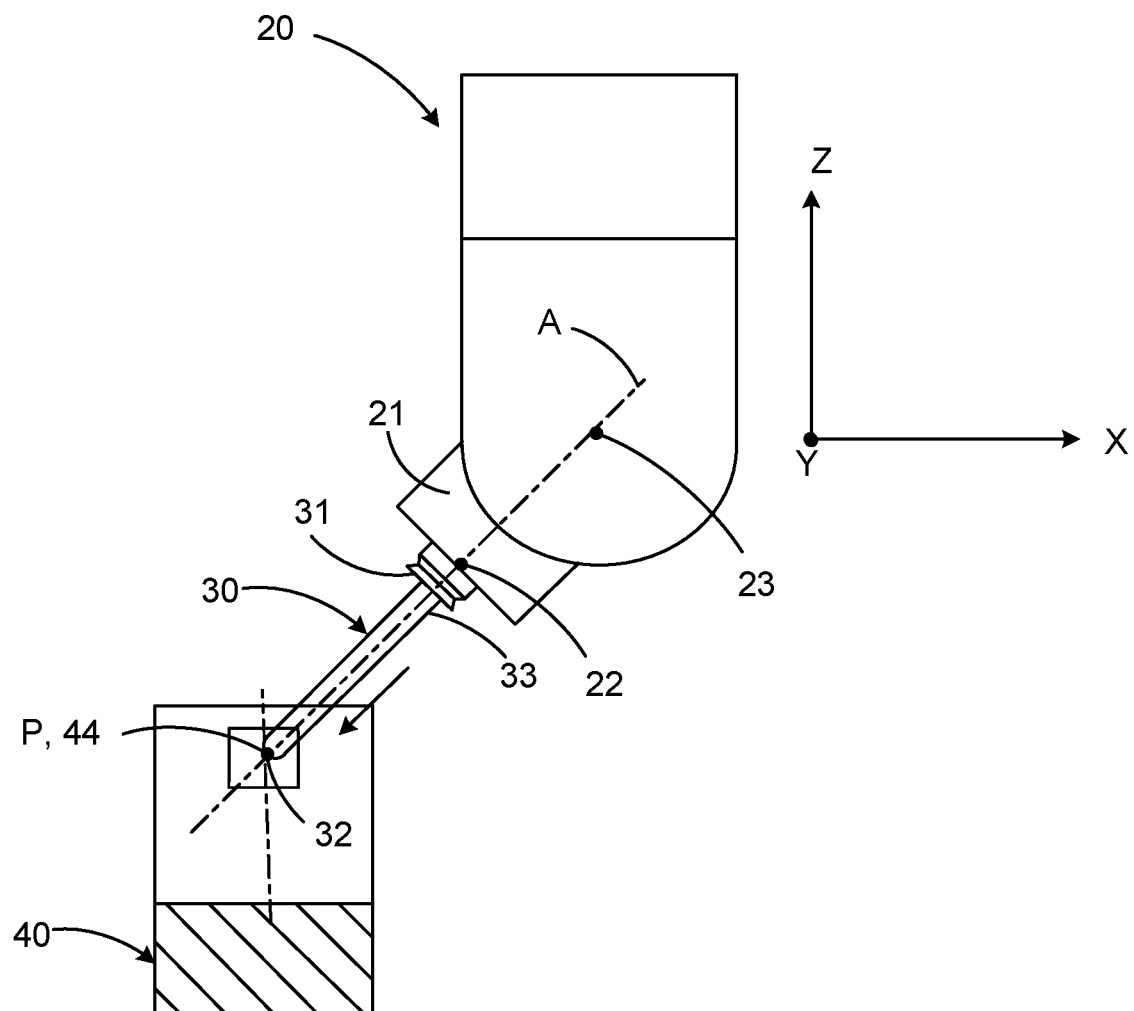
FIG. 17B is a schematic side view of FIG. 17A.

FIGS. 8 to 16B are views to describe processes to determine an actual position of the tip 32 while keeping an orientation of the tool for machining. Specifically, FIG. 8 is a schematic perspective view illustrating the tool 30 just before the process is started. FIG. 9A is a schematic perspective view illustrating a process to turn the shade detector 40 around the tool 30. FIG. 9B is a schematic side view of FIG. 9A. FIG. 10A is a schematic perspective view illustrating a process to obtain a position of the reference point 22 when the tip 32 is matched with the measurement position P of the shade detector 40 based on an orientation of the tool for machining and a previously recorded length of the tool. FIG. 10B is a schematic side view of FIG. 10A. FIG. 11A is a schematic perspective view illustrating a process to determine a position to measure the same-diameter cylindrical portion 33 of the tool 30. FIG. 11B is a schematic side view of FIG. 11A. FIG. 12A is a schematic perspective view illustrating a process to measure one side of the same-diameter cylindrical portion 33 by moving the tool 30 in one axial direction toward the laser light 44. FIG. 12B is a schematic side view of FIG. 12A. FIG. 13A is a schematic perspective view illustrating a process to determine a position to measure an opposite side of the same-diameter cylindrical portion 33 of the tool 30. FIG. 13B is a schematic side view of FIG. 13A. FIG. 14A is a schematic perspective view illustrating a process to measure an opposite side of the same-diameter cylindrical portion 33. FIG. 14B is a schematic perspective view of FIG. 14A. FIG. 15 is a view to describe a process to specify an axial line A of the tool 30. FIG. 16A is a schematic perspective view illustrating a process to move the tool 30 such that the measurement position P of the shade detector 40 is positioned on the axial line A of the tool 30. FIG. 16B is a schematic side view of FIG. 16A. FIG. 17A is a schematic perspective view illustrating a process to linearly move the tool 30 toward the measurement position P along the axial line A of the tool 30. FIG. 17B is a schematic side view of FIG. 17A.

Figure 9A:
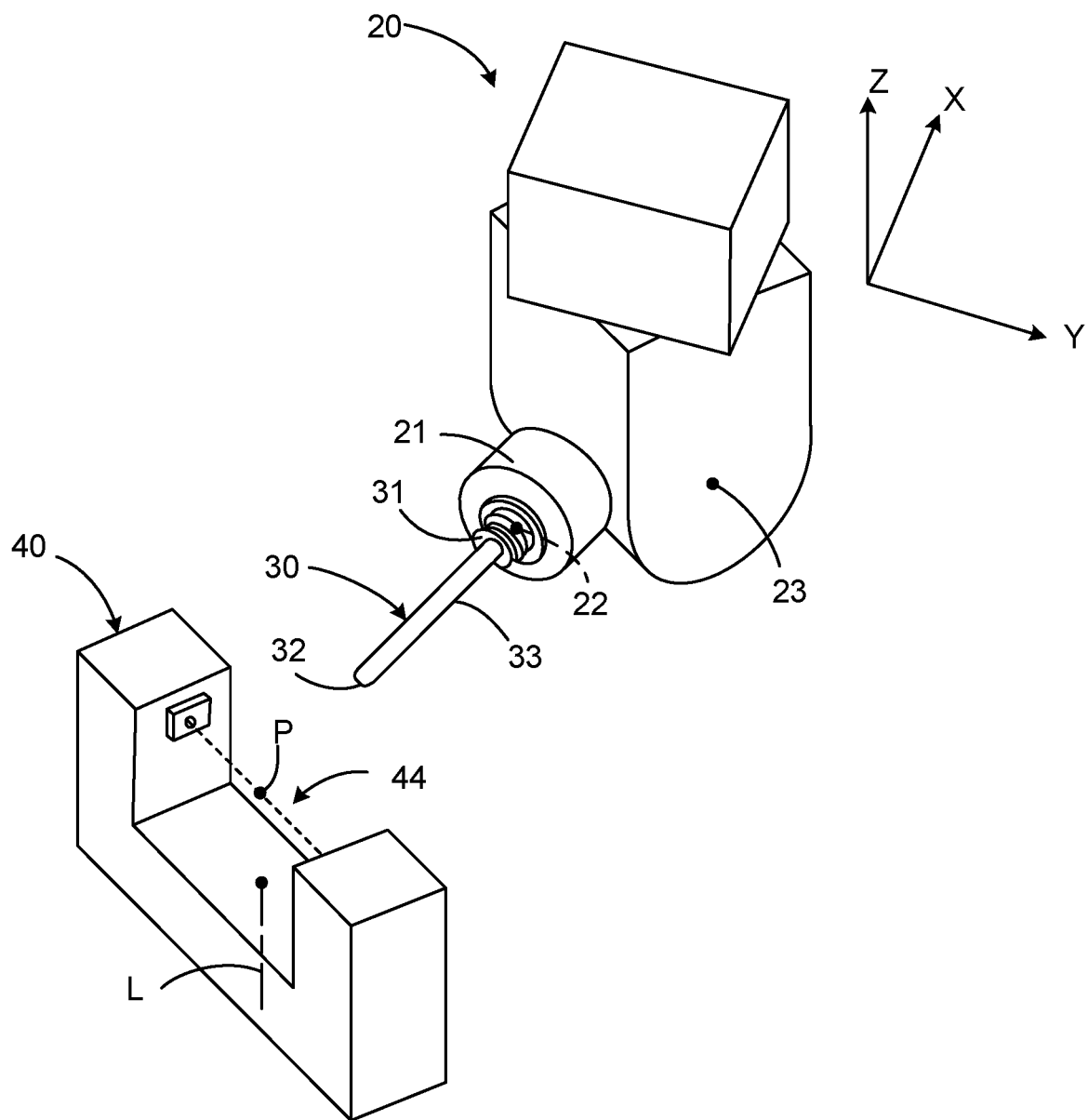
FIG. 9A is a view to describe a process to determine an actual position of a tip of the tool while keeping an orientation of the tool for machining and is a schematic perspective view illustrating a process to rotate a shade detector around a tool.
Figure 9B:
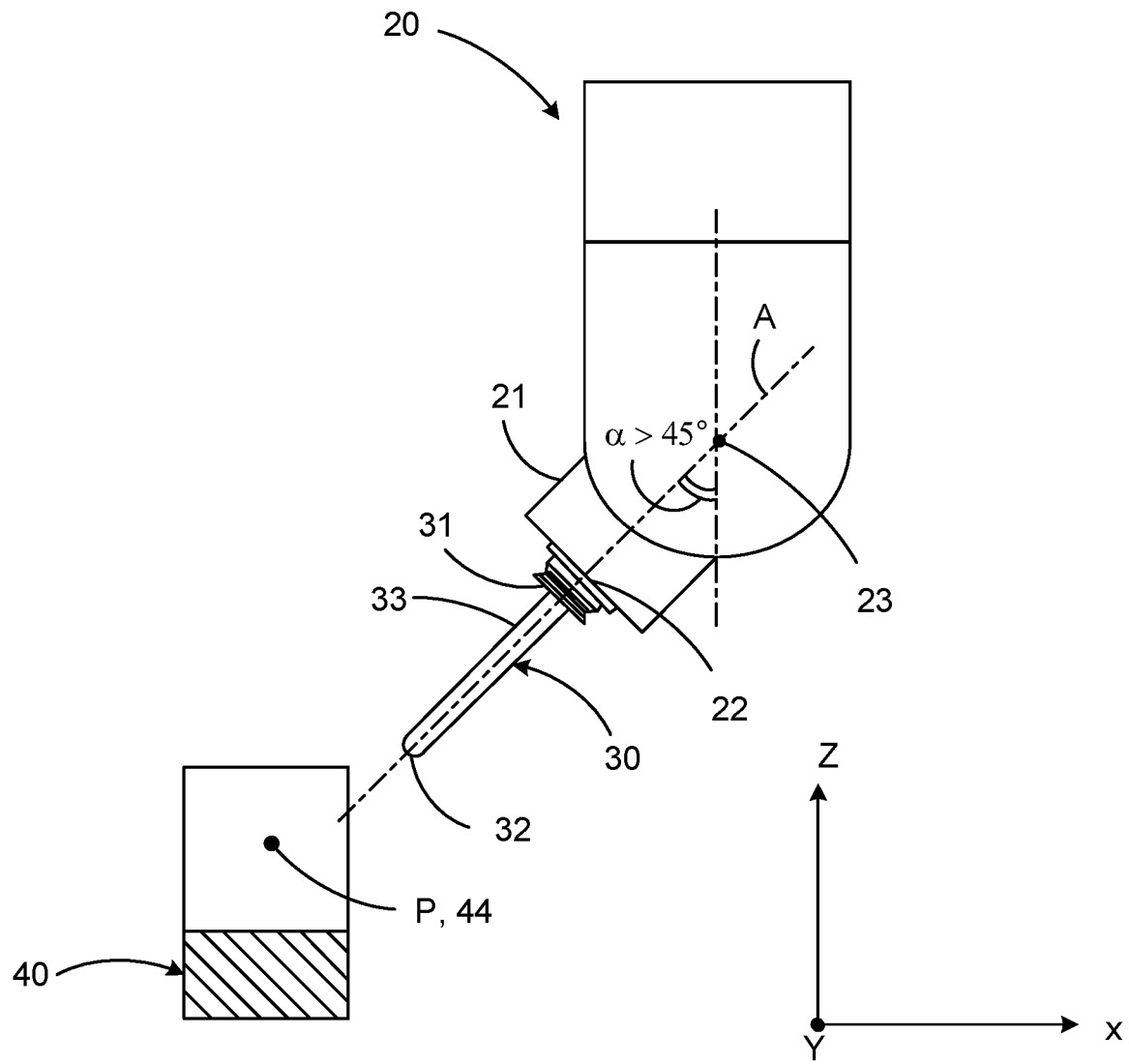
FIG. 9B is a schematic side view of FIG. 9A.

First, as illustrated in FIG. 8, rotation of the tool 30 which has finished machining is stopped, and an orientation of the tool 30 just before finishing machining, specifically values of B and C axes (refer to FIG. 8), are maintained. As illustrated in FIGS. 9A and 9B, an optical path of the laser light 44 of the shade detector 40 is positioned so as to be vertical in an axial line direction of the tool 30. Meanwhile, an orientation of the tool 30 is kept to an orientation just before the tool 30 finishes machining (values of B and C axes are kept). To simplify an understanding of the process, the shade detector 40 is illustrated by a perspective view in FIG. 9B. This can be said in FIGS. 10B, 11B, 12B, 13B, 14B, 16B, and 17B. In each drawing after FIG. 9A, the rotary table 47 is not illustrated.

Figure 10A:
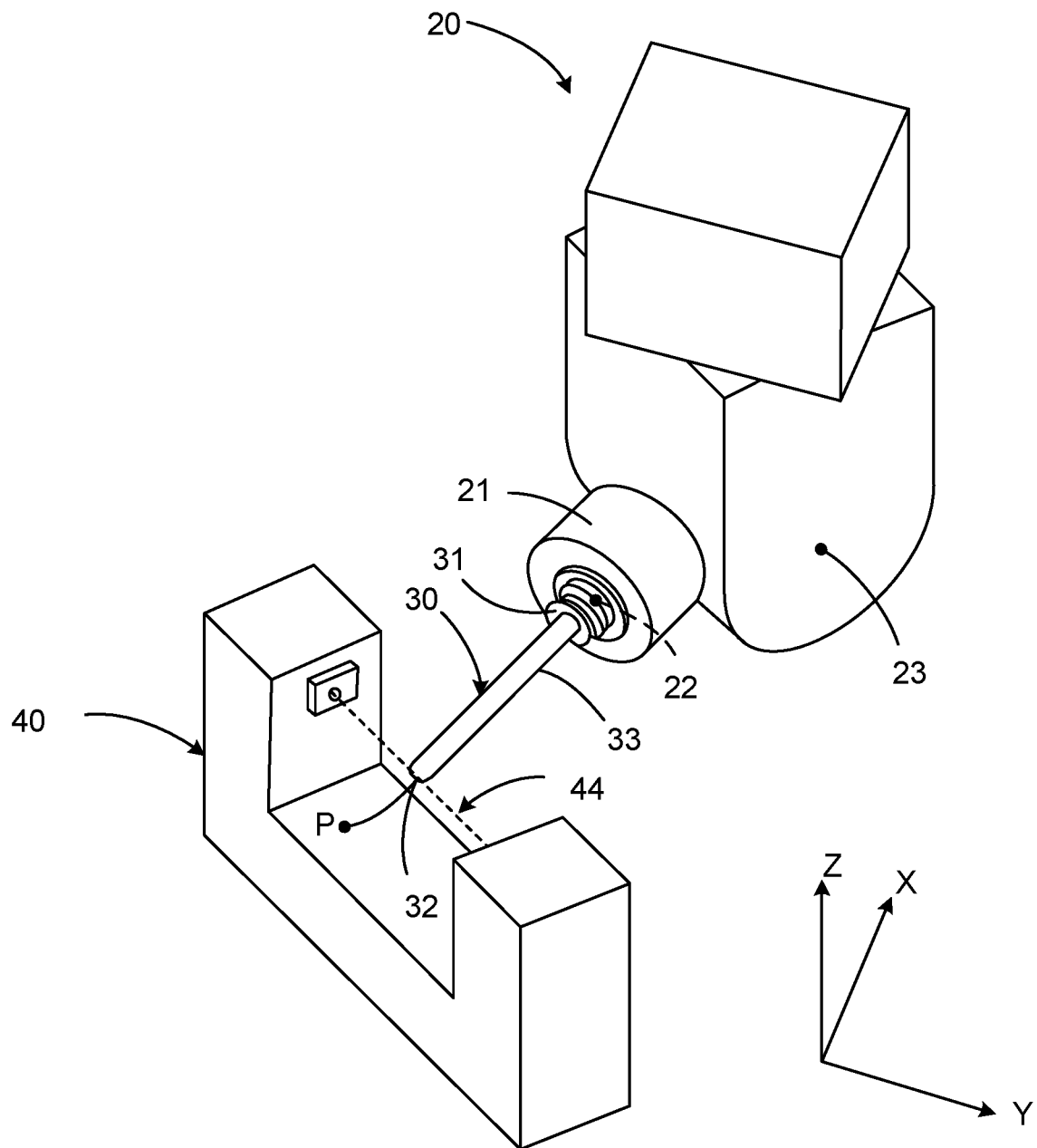
FIG. 10A is a view to describe a process to determine an actual position of a tip of the tool while keeping an orientation of the tool for machining and is a schematic perspective view illustrating a process in which a tip of the tool is matched with a measurement position of a shade detector based on an orientation of the tool for machining and a length of the tool recorded in advance.
Figure 10B:
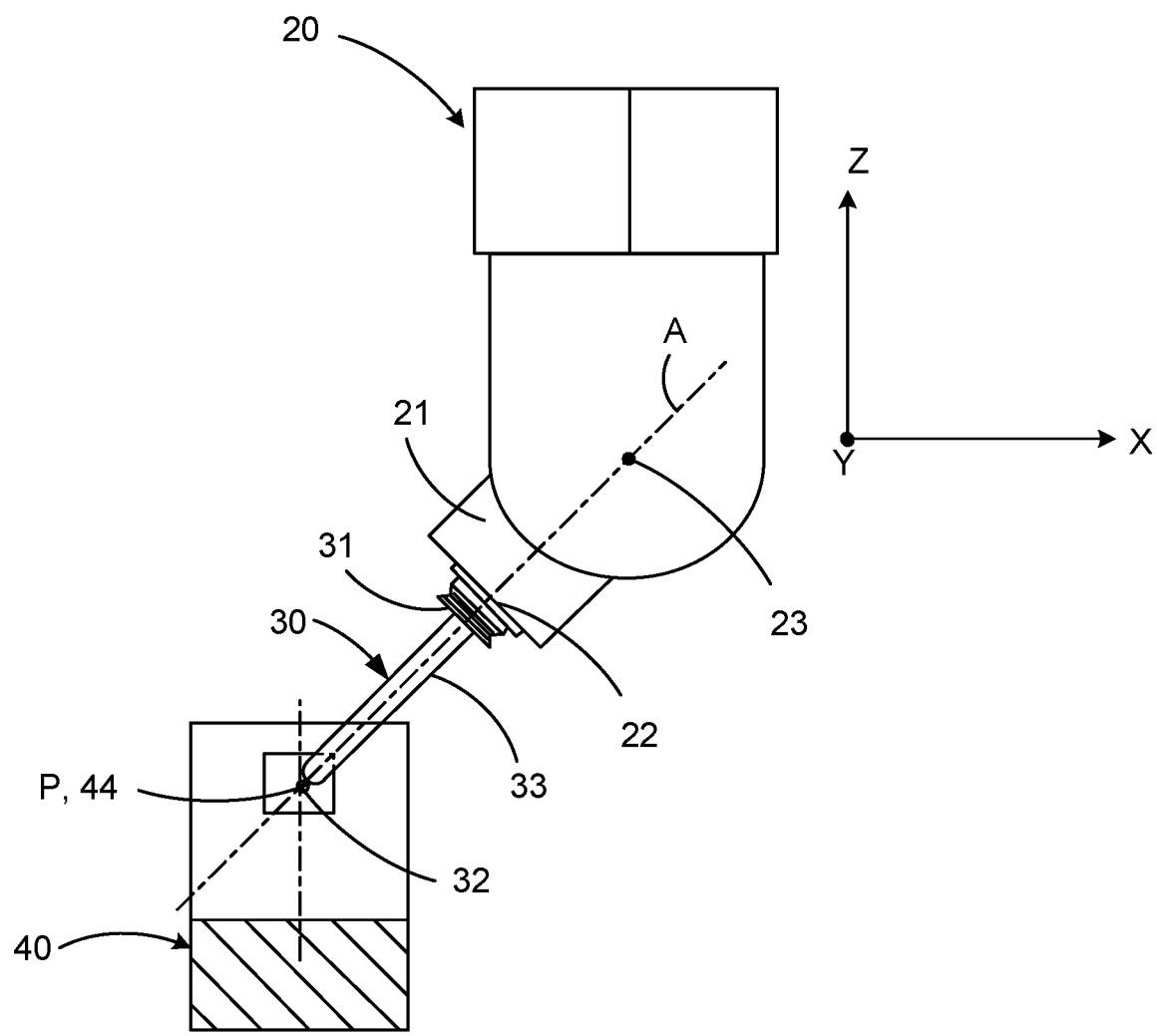
FIG. 10B is a schematic side view of FIG. 10A.

In addition, the computation unit 52 calculates a position of the reference point 22 in the case where the tip 32 is matched with the measurement position P of the shade detector 40 based on an orientation of the tool for machining and a length of the tool. In addition, the tool 30 is moved such that a coordinate value of the reference point 22 of the tool holding portion 21 is matched with a position (a coordinate value) of the reference point 22 determined by the calculation. In addition, the rotary table 47 is rotated around the center axis L such that an optical path of the laser light 44 and an axial line A of the tool 30 are orthogonal to each other. As a result, as illustrated in FIGS. 10A and 10B, the tip 32 of the tool 30 is substantially matched with the measurement position P of the laser light 44 in a state in which the axial line A of the tool 30 and an optical path of the laser light 44 are orthogonal to each other. As an example of an orientation of the tool 30 just before the tool 30 finishes machining, FIGS. 8 to 16B illustrate an orientation that a straight line (the axial line A of the tool) connecting the reference point 22 and the rotation center 23 forms an angle α (refer to FIG. 9B) larger than 45° clockwise with respect to a virtual axis line extending in a vertical lower direction from the rotation center 23.

Figure 11A:
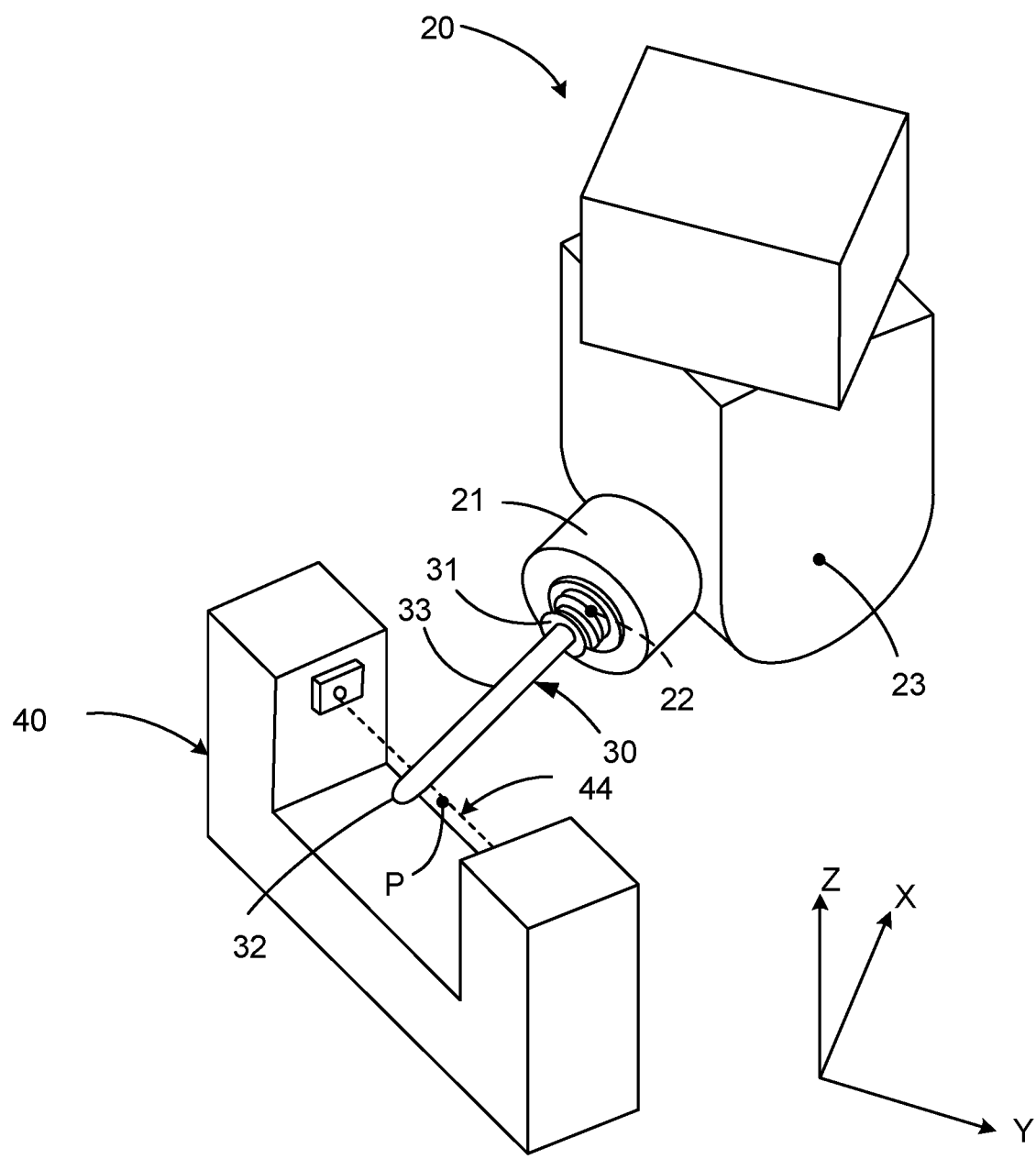
FIG. 11A is a view to describe a process to determine an actual position of a tip of the tool while keeping an orientation of the tool for machining and is a schematic perspective view illustrating a process to determine a position to measure a same-diameter cylindrical portion of a tool.
Figure 11B:
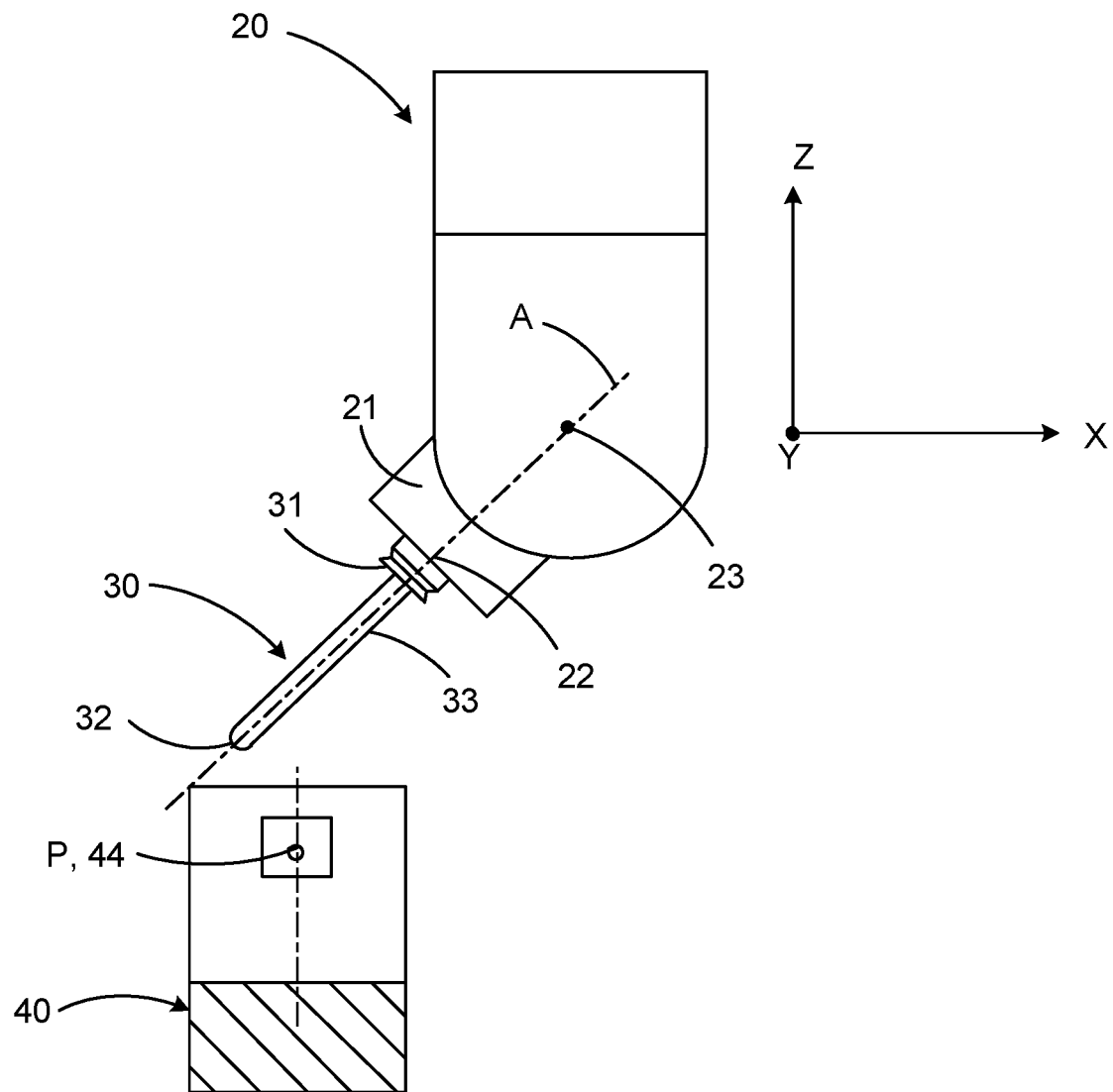
FIG. 11B is a schematic side view of FIG. 11A.

Further, as illustrated in FIGS. 11A and 11B, the tool 30 is moved upward by the driving unit 60 in a state in which the above-described orientation (values of B and C axes) is maintained. Specifically, in this movement, the tool 30 is moved in a vertical upper direction (an upper side in FIG. 6B) by a distance equal to twice of the diameter D (2D) of the edge of the tool 30, and also the tool 30 is moved by a distance equal to twice of the diameter D (2D) of the edge of the tool 30 in a direction orthogonal to the laser light 44 in a horizontal plane (a left side in FIG. 6B). This movement is to previously position the tool 30 so as to certainly shade the laser light 44 by the same-diameter cylindrical portion 33, not by the tip 32, when the tool 30 is moved in a process to be described later. By this movement, the same-diameter cylindrical portion 33 of the tool 30 is positioned on a vertical upper side of the laser light 44. In FIG. 6B, the tool 30 after being positioned is indicated by a solid line. In another embodiment, for example, after a shade state of the laser light 44 is eliminated, the movement of the tool 30 may be stopped after the tool is moved by a distance of the diameter D of a tip area (edge). The tool 30 may be moved by a certain distance (for example, 20 mm), not by twice of the diameter D of an edge of the tool 30 when the tool 30 is moved upward by the driving unit 60.

Figure 12A:
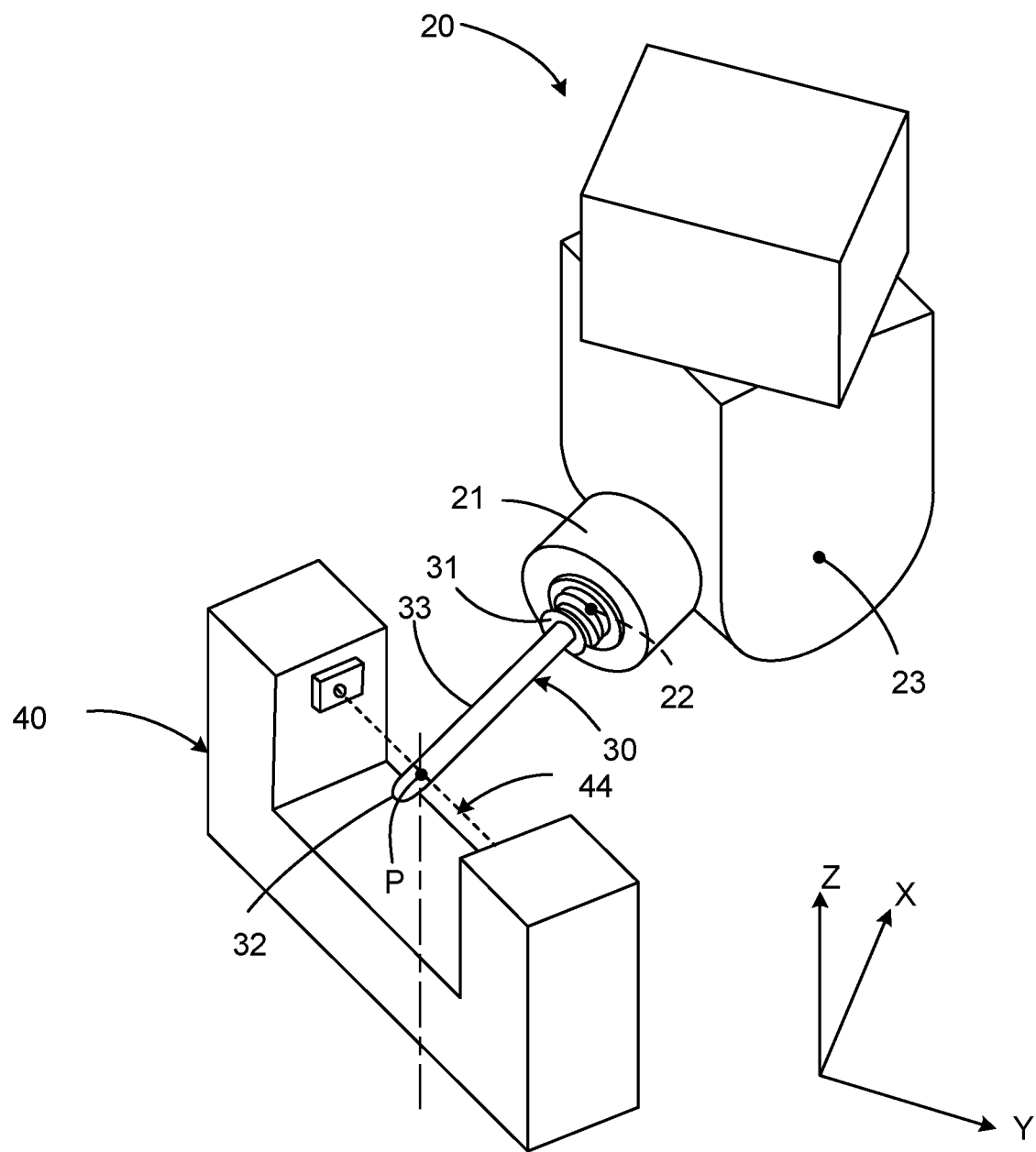
FIG. 12A is a view to describe a process to determine an actual position of a tip of the tool while keeping an orientation of the tool for machining and a schematic perspective view illustrating a process to move a tool in one axial direction toward a laser light and to measure one side of a same-diameter cylindrical portion.
Figure 12B:
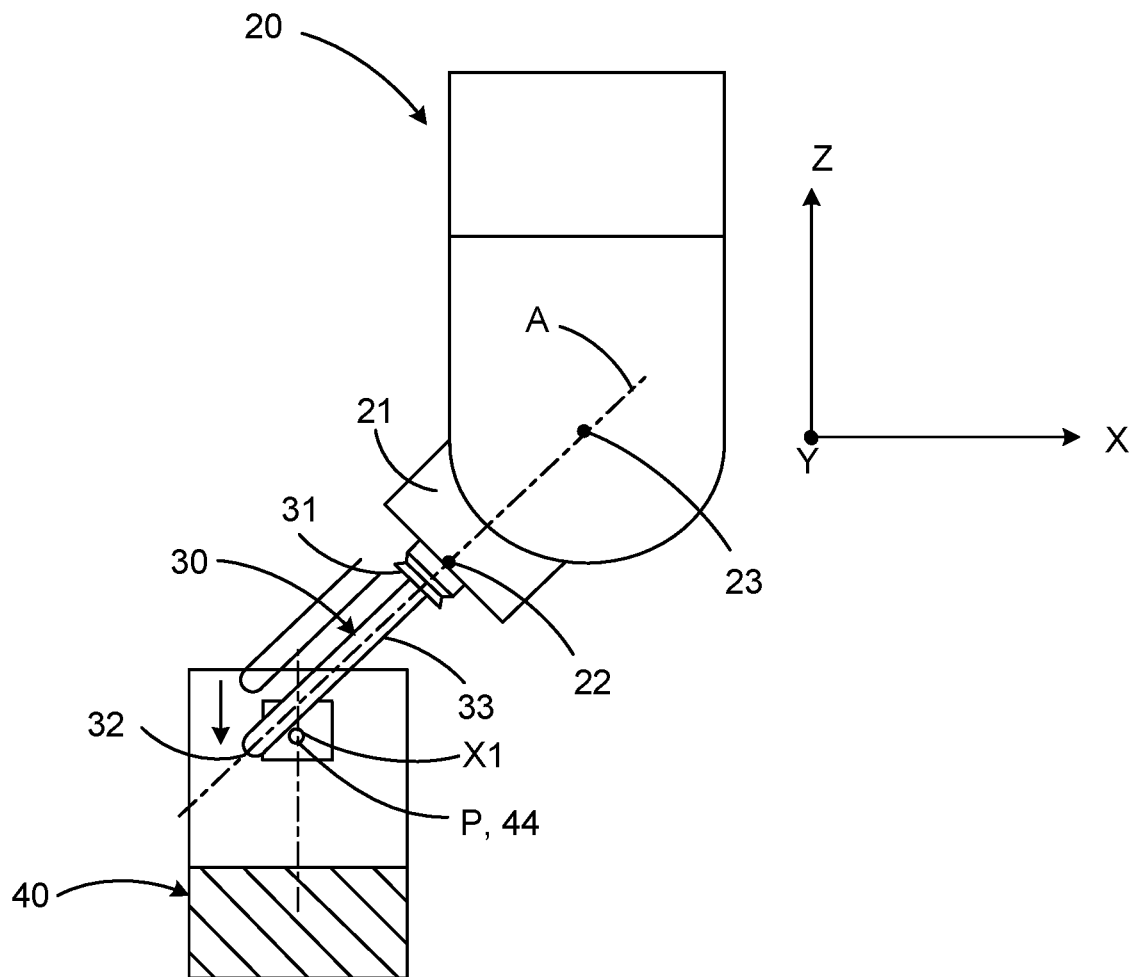
FIG. 12B is a schematic side view of FIG. 12A.

Further, as illustrated in FIGS. 12A and 12B, the tool 30 is moved in a vertical lower direction (a lower side of FIGS. 12A and 12B) by the driving unit 60 in a state in which the orientation is maintained. A first portion X1 is a lower end of a shared portion (elliptic sectional surface) with a plane defined by a plane including an optical path of the laser light 44 and the rotation center axis L of the rotary table 47 and the same-diameter cylindrical portion 33. The first portion X1 reaches to the measurement position P of the shade detector 40, and the same-diameter cylindrical portion 33 shades a certain percentage of the laser light 44, when this movement is continued. In FIG. 12B, the tool 30 before the movement is indicated by a broken line. The tool 30 in a state in which the same-diameter cylindrical portion 33 shades a certain percentage of the laser light 44 is indicated by a solid line. When a certain percentage of the laser light 44 is shaded by the same-diameter cylindrical portion 33, the shade detector 40 issues a skip signal to the control unit 51 of the controller 50. The control unit 51 which has received the skip signal causes the computation unit 52 to obtain a coordinate value of the reference point 22 at the time. The coordinate value is sent from the computation unit 52 to the control unit 51 and stored in the control unit 51 as a first coordinate value Q1.

Figure 13A:
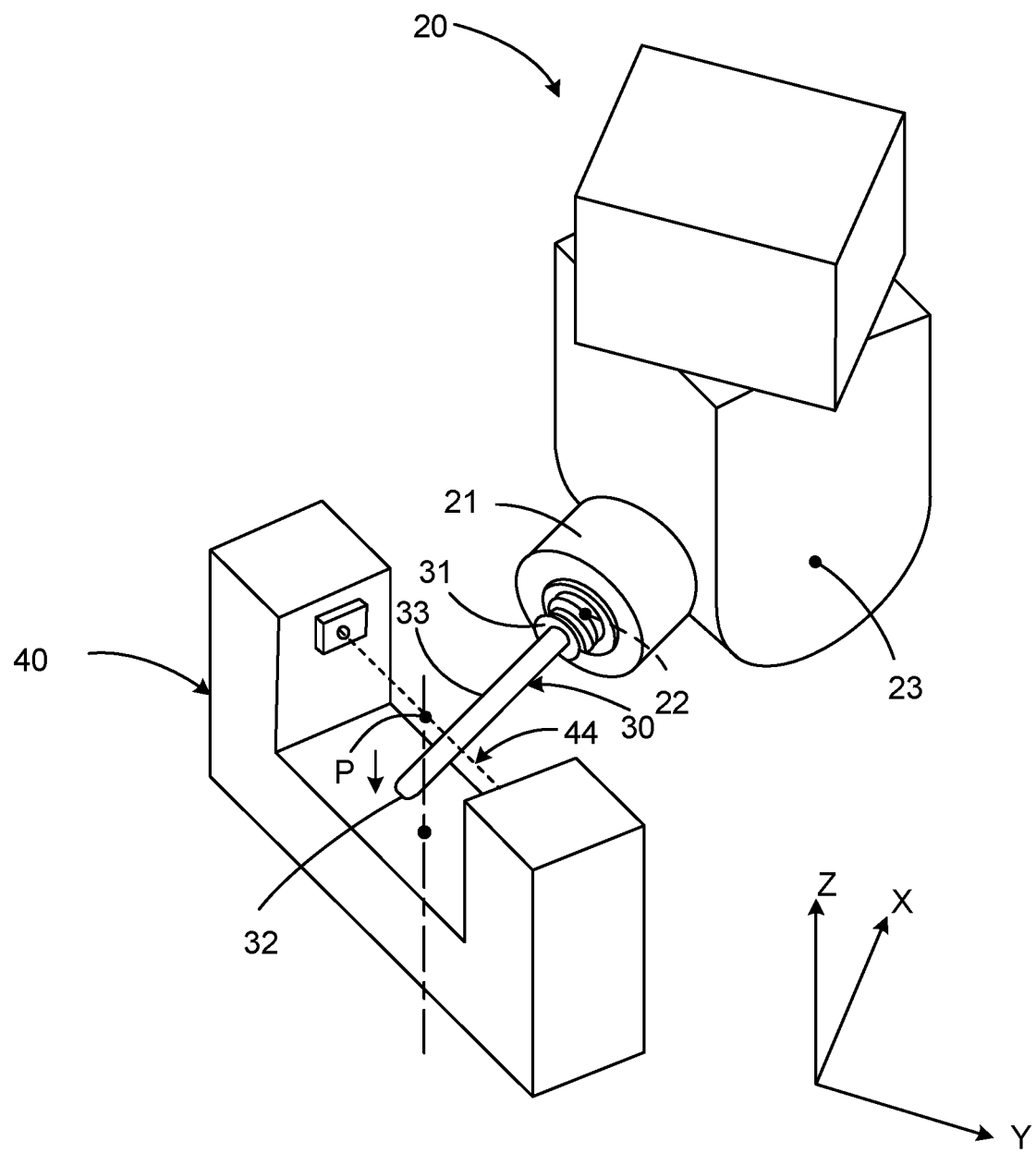
FIG. 13A is a view to describe a process to determine an actual position of a tip of the tool while keeping an orientation of the tool for machining and is a schematic perspective view illustrating a process to determine a position to measure an opposite side of the same-diameter cylindrical portion of a tool.
Figure 13B:
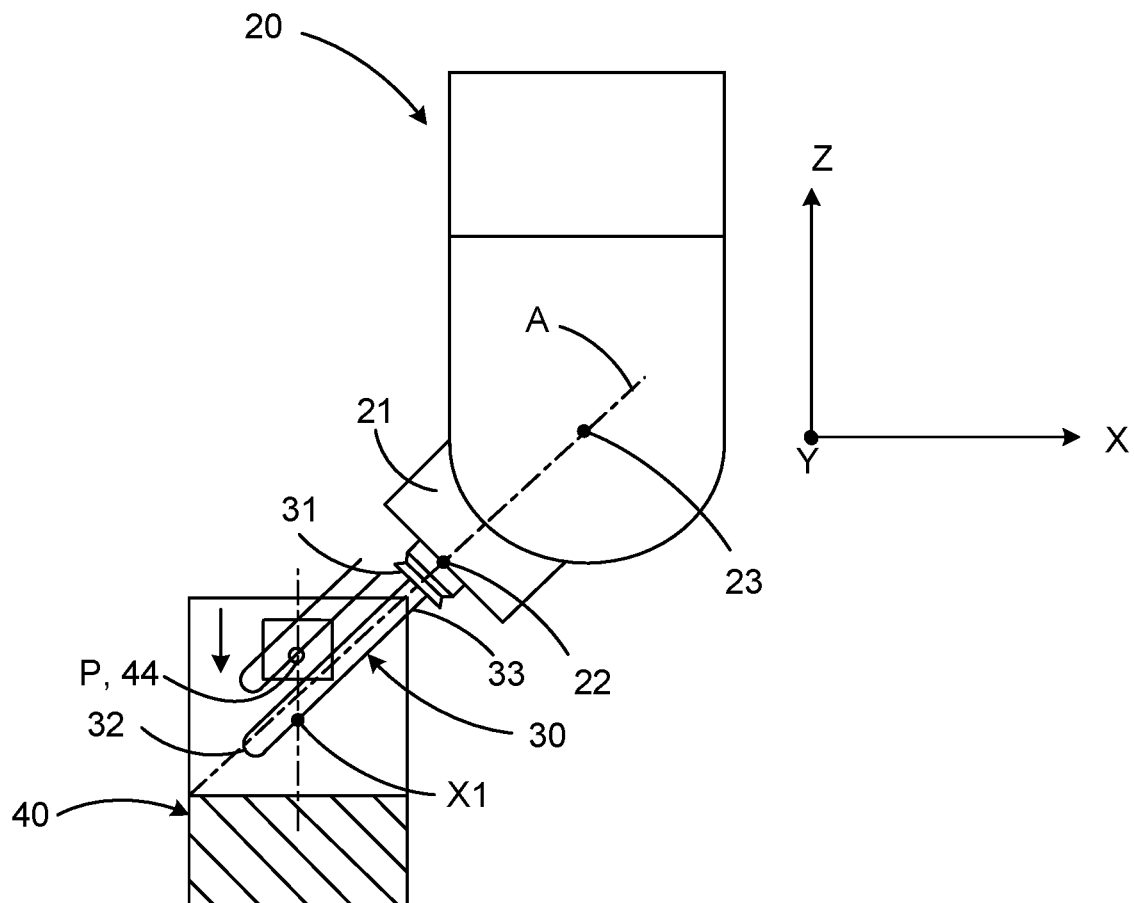
FIG. 13B is a schematic side view of FIG. 13A.

Further, as illustrated in FIGS. 13A and 13B, the control unit 51 which has received the skip signal stops movement of the tool 30 at a position where the same-diameter cylindrical portion 33 completely crosses the laser light 44 via the driving unit 60. In the embodiment, after a shade state of the laser light 44 by the same-diameter cylindrical portion 33 is finished, specifically after the same-diameter cylindrical portion 33 completely crosses the laser light 44, the movement of the tool 30 is stopped at a position where the same-diameter cylindrical portion 33 is further moved downward by a distance of the diameter D of the same-diameter cylindrical portion 33. In FIG. 13B, the tool 30 in a state in which a certain percentage of the laser light 44 is shaded by the same-diameter cylindrical portion 33 is indicated by a broken line, and the tool 30 after the movement (during stop) is indicated by a solid line.

Figure 14A:
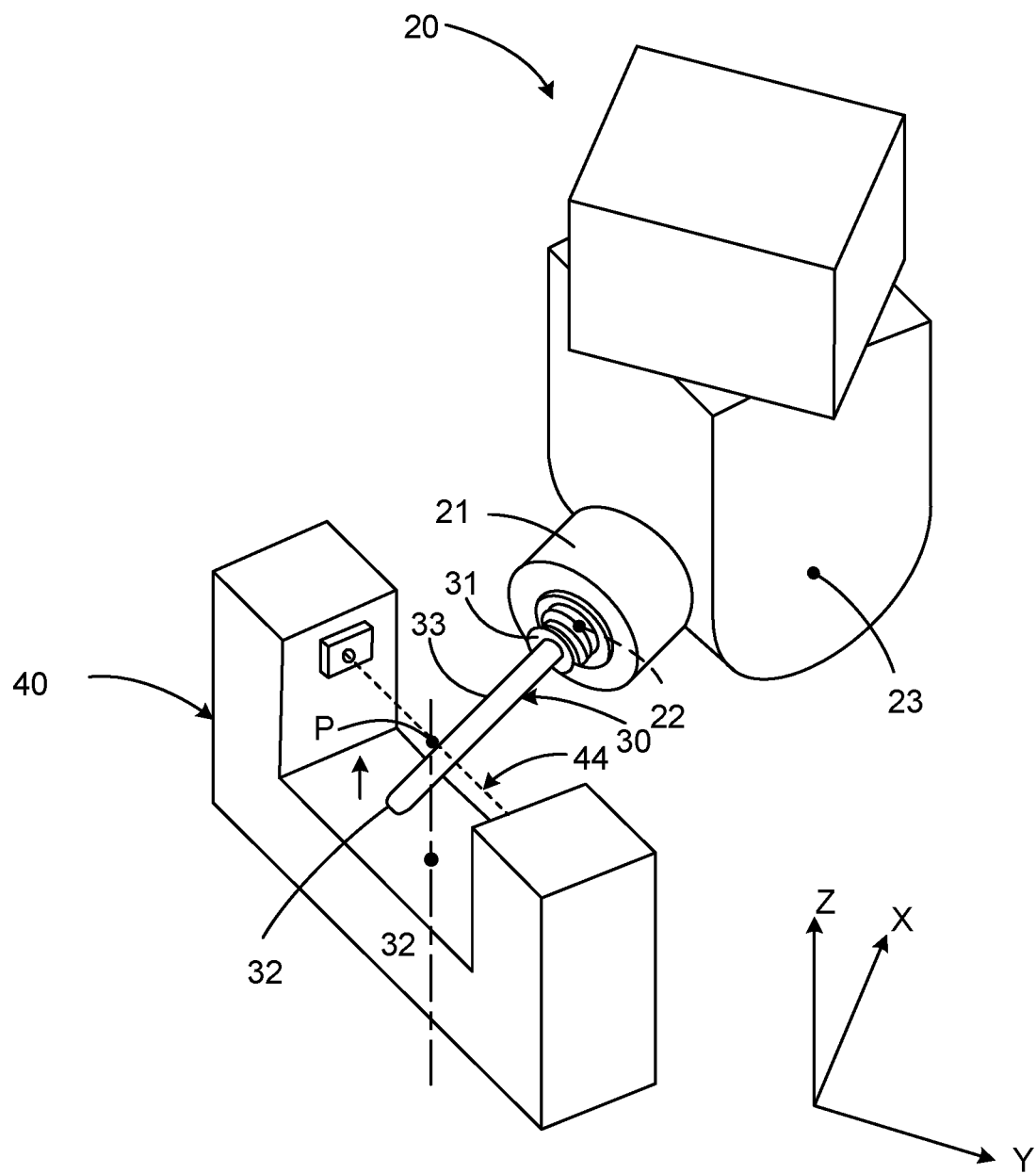
FIG. 14A is a view to describe a process to determine an actual position of a tip of the tool while keeping an orientation of the tool for machining and is a schematic perspective view illustrating a process to measure an opposite side of a same-diameter cylindrical portion.
Figure 14B:
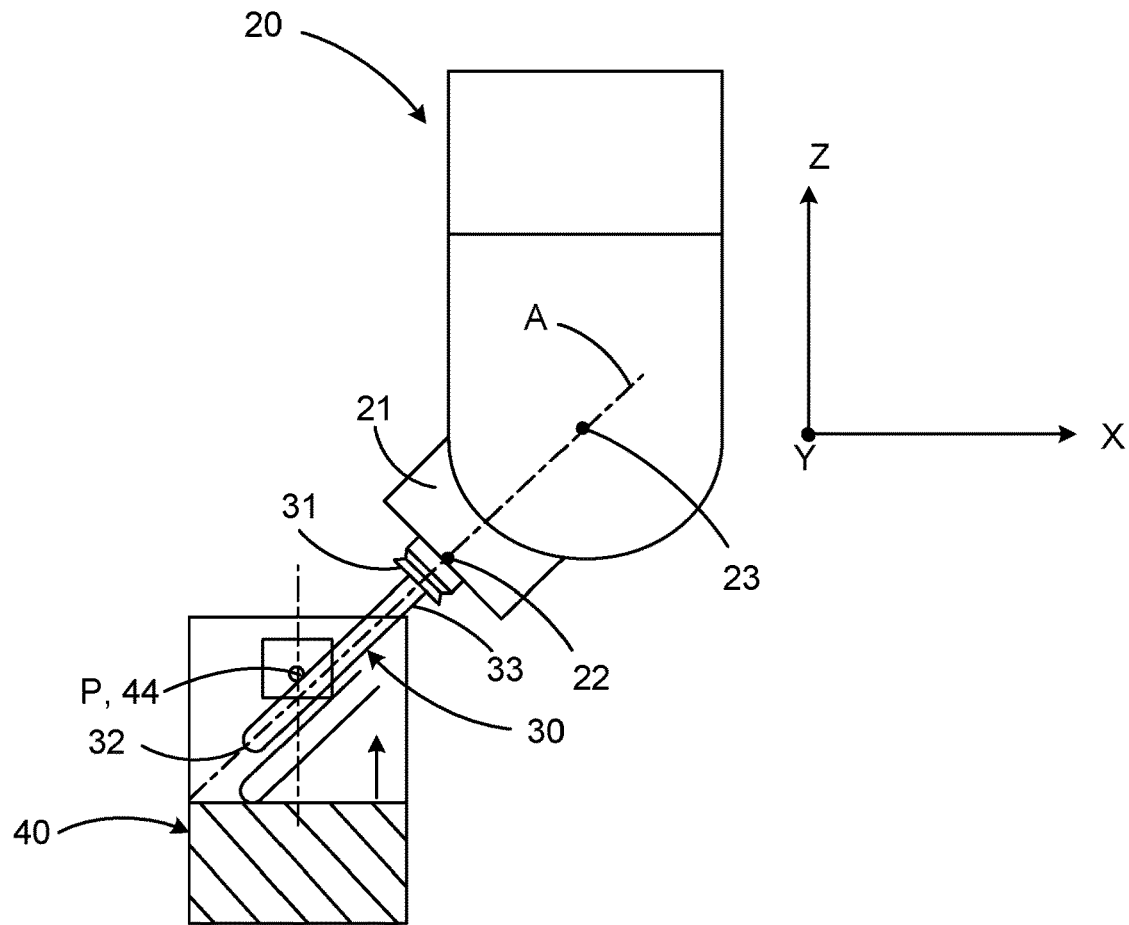
FIG. 14B is a schematic side view of FIG. 14A.

Further, as illustrated in FIGS. 14A and 14B, the driving unit 60 moves the tool 30 in a vertical upper direction (an upper side of FIGS. 14A and 14B) in a state in which the orientation of the tool 30 is maintained. A second position X2 is an upper end of a shared portion (elliptic sectional surface) with a plane defined by an optical path of the laser light 44 and the rotation center axis L of the rotary table 47 and the same-diameter cylindrical portion 33. The second position X2 reaches to the measurement position P of the shade detector 40, and again the same-diameter cylindrical portion 33 shades a certain percentage of the laser light 44, when this movement is continued. In FIG. 14B, the tool 30 before movement is indicated by a broken line. The tool 30 in a state in which the same-diameter cylindrical portion 33 shades a certain percentage of the laser light 44 is indicated by a solid line.

When a certain percentage of the laser light 44 is shaded by the same-diameter cylindrical portion 33, the shade detector 40 issues a skip signal to the control unit 51 of the controller 50. The control unit 51 which has received the skip signal causes the computation unit 52 to obtain a coordinate value of the reference point 22 at the time. This coordinate value is sent from the computation unit 52 to the control unit 51 and stored in the control unit 51 as a second coordinate value Q2. Further, when the control unit 51 receives a skip signal, the control unit 51 stops movement of the tool 30 via the driving unit 60.

Then, as illustrated in FIG. 15, the computation unit 52 obtains the central point M between the first coordinate value Q1 of the first portion X1 and the second coordinate value Q2 of the second portion X2 and then calculates a straight line connecting the measurement position P of the shade detector 40 and the central point. The calculated straight line is stored in the control unit 51. This straight line is recognized as the axial line A of the same-diameter cylindrical portion 33 of the tool 30 in the orientation as indicated by a process to shade the laser light 44 by the same-diameter cylindrical portion 33.

Further, as illustrated in FIGS. 16A and 16B, the tool 30 is moved by the driving unit 60 such that the reference point 22 positions on a straight line Am connecting the measurement position P and the central point M of the shade detector 40 in a state in which the tool 30 keeps the orientation. This movement is, as illustrated, finished at a position where the axial line A of the tool 30 and an optical path of the laser light 44 cross outside of the tool 30. At this time, the straight line Am coincides with the axial line A of the tool 30. In FIG. 16B, the tool 30 is indicated by a broken line before movement, and the tool 30 is indicated by a solid line after the movement.

Further, as illustrated in FIGS. 17A and 17B, the driving unit 60 is moved toward the measurement position P of the shade detector 40 along the axial line A of the tool 30 so as to shade the laser light 44 by the tool 30. When a certain percentage of the laser light 44 is shaded by the tip 32, the shade detector 40 issues a skip signal to the control unit 51 of the controller 50. The control unit 51 which has received the skip signal causes the computation unit 52 to obtain a coordinate value of the reference point 22 at the time. This coordinate value is sent from the computation unit 52 to the control unit 51 and stored in the control unit 51 as a coordinate value corresponding to a position of the tip 32 in a state in which the tip 32 is positioned at the measurement position P. As a result, while keeping a predetermined orientation state (orientation for machining) of the tool 30, an actual position (coordinate value) of the tip 32 before the tool 30 is exchanged in a state in which an orientation error of the machine tool 100 is included is accurately specified.

Then, the tool 30 is removed from the tool holding portion 21, the tool holding portion 21 is held by the new tool 30A for next machining, and the above-described processes corresponding to FIGS. 8 to 17B are performed to the tool 30A after exchange. As a result, in an orientation of the tool for machining, specifically, in a state in which an orientation error of the machine tool 100 is included, an actual position (coordinate value) of the tip 32A of the tool 30A after exchange is accurately specified.

Further, based on a difference between an actual position of the tip 32A of the tool 30A after exchange and an actual position of the tip 32 of the tool 30 before exchange, a position of the tip 32A of the tool 30A after exchange is corrected. Specifically, the tool 30A after exchange is moved such that the tip 32A of the tool 30A after exchange is matched with a position of the tip 32 of the tool 30 before exchange.

Regarding the tool 30A after exchange, as with the tool 30 before exchange, a length of the tool is previously measured by a tool presetter before the tool 30A is mounted to the machine tool 100, and a measurement result (length of the tool) is recorded in the control unit 51 of the controller 50.

Alternatively, the method is effective in a scene in which an error caused in the case where an orientation of the tool 30 is changed is corrected. The error caused in the case where an orientation of the tool 30 is changed means an error caused by the tip 32 by changing a weight balance of the machine tool 100 by the orientation change. A specific correction method is similar to the above-described description describing the case where the tool is exchanged. That is, the above-described processes corresponding to FIGS. 8 to 17B are performed with respect to the tool 30 after the orientation change. As a result, in an orientation of the tool for machining, specifically, in a state in which an orientation error of the machine tool 100 is included, an actual position (coordinate value) of the tip 32 of the tool 30 after the orientation change is accurately specified.

Further, based on a difference between an actual position of the tip 32 of the tool 30 before the orientation change and an actual position of the tip 32 of the tool 30 before the orientation change, a position of the tip 32 of the tool 30 after the orientation change is corrected. That is, the tool 30 is moved after the orientation change such that a position of the tip 32 of the tool 30 after the orientation change is matched with a position of the tip 32 of the tool 30 before the orientation change.

According to the machine tool 100 of the above-described embodiment, in a state in which an orientation error of the machine tool caused by an error generated to a series of components including from the table 11, on which the workpiece W is placed, to the index head 20, a position (coordinate value) of the tip 32 of the tool 30 is directly evaluated. Specifically, in a state in which the orientation error is included, a position of the tip 32 of the tool 30 before an orientation change or before exchange can be accurately specified. Therefore, the tips 32 and 32A of the tools 30 and 30A after the orientation change to the position or after exchange are accurately matched respectively. As a result, it is possible to provide a machine tool which can smoothly connect formed curved surfaces without considering the orientation error.

Alternatively, according to a method in the above-described embodiment, in a state in which the orientation error of a machine tool is included, a position (coordinate value) of the tip 32 of the tool 30 is directly evaluated. Specifically, a position of the tip 32 of the tool 30 before an orientation change or before exchange can be accurately specified. Therefore, the tips 32 and 32A of the tools 30 and 30A after the orientation change to the position or after exchange are accurately matched respectively. As a result, a method for correcting a position of the tips 32 and 32A at which formed curved surfaces are smoothly connected without considering the orientation error.

Further, the driving unit 60 according to the embodiment can freely control an orientation of the tool 30 and a position of the tip 32 since five-axis control of the tool 30 (control regarding X, Y, Z, B, and C axes in FIG. 3) is possible.

When an orientation of the tool for machining is changed, based on an orientation and a length of the tool 30 after an orientation change, the controller 50 specifies a position (coordinate value) of the reference point 22 in a state in which the tip 32 is actually matched with the measurement position P of the laser light 44 while keeping the orientation of the tool after the change, and the controller 50 corrects a position of the tip 32 of the tool 30 after the orientation change based on a difference between a position of the tip 32 of the tool 30 before the orientation change and a position of the tip 32 of the tool 30 after the orientation change. Therefore, it is easy to accurately match the position of the tip 32 of the tool 30 before the orientation change with the position of the tip 32 of the tool 30 after the orientation change.

Alternatively, when a tool is exchanged for the new tool 30A, based on an orientation and a length of the new tool 30A, the controller 50 specifies a position of the reference point 22 in a state in which the tip 32A of the new tool 30A is actually matched with the measurement position P of the laser light 44 while keeping an orientation of the tool for machining, and the controller 50 corrects a position of the tip 32A of the new tool 30A in an orientation of the tool for machining, based on a difference between a position of the tip 32 of the tool 30 before exchange and a position of the tip 32A of the new tool 30A. Therefore, it is easy to accurately match the position of the tip 32A of the new tool 30A with the position of the tip 32 of the tool 30 before exchange.

The embodiment describes the case where a coordinate value of the tip 32 in a state in which the tool 30 is exchanged is corrected. In addition, for example, it is effective to correct a coordinate value of the tip 32 without changing a tool to correspond to an orientation error generated when a time passes. That is, when a time passes without changing the tool 30, an orientation error generates to the machine tool 100 by such as a room temperature change. Therefore, it is effective to correct a coordinate value of the tip 32 to eliminate the orientation error. Specifically, in the case where a long time passes in a state in which the tool 30 is held, and an orientation error is caused to the machine tool 100 by such as a room temperature change, a position error of the tip 32 of the tool 30 may be caused. In such a case, according to the machine tool of the embodiment, a position of the tip 32 of the tool 30 is accurately specified. Accordingly, a curved surface formed by the tool 30 before an orientation change and a curved surface formed by the tool 30 after the orientation change are smoothly continued.

In the case where a straight line (the axial line A of a tool) connecting the reference point 22 and the rotation center 23 forms an angle of 45° or larger and 95° or smaller clockwise with respect to a virtual axial line extending in a vertical lower direction from the rotation center 23, specifically in the case where a B axis has an angle of 45° or larger and 95° or smaller, as described above, the tool 30 is moved in a vertical lower direction (a lower side in FIGS. 12A to 14B) by the driving unit 60 as described with reference to FIGS. 12A to 14B. On the other hand, in the case where an angle of the B axis is 0° or larger and 45° or smaller, the tool 30 is moved in a horizontal direction (a lateral direction in FIGS. 12A to 14B) by the driving unit 60. As a result, it is prevented that an angle formed in a movement direction of the tool 30 and an axial direction of the tool are excessively small, and the tool 30 can be efficiently measured without significantly increasing a movement distance of the tool 30.

In the case where an angle of the B axis is 0° or larger and 45° or smaller, and the tool 30 is horizontally moved by the driving unit 60, in a process to determine a position to measure the same-diameter cylindrical portion 33 of the tool 30 corresponding to FIG. 11A, the tool 30 is moved by 2D in a horizontal direction and moved by 2D in a vertical lower direction (negative Z axis direction). In this case, in a shared portion (elliptic sectional surface) with a horizontal surface including the measurement position P of the shade detector 40 and the same-diameter cylindrical portion 33, a left end in FIG. 11A is a first portion, and a right end in FIG. 11A of the shared portion (elliptic sectional surface) is a second portion. Detailed descriptions of the following processes will be omitted since the processes are substantially same as the above-described processes.

The above-described embodiment describes that a machine tool can perform five-axis control. However, the machine tool capable of orthogonal three-axis control is also applicable. In this case, operations interlocking with the movement of B and C axes are omitted. In this case, regardless whether a direction of a main axis is a vertical direction or a horizontal direction, an optical path of the laser light 44 of the shade detector 40 should be provided so as to be orthogonal to a tool held by the main axis.

The invention claimed is:

1. A method for correcting a position of a tip of a machine tool, wherein the machine tool comprises:
a mounting table on which a workpiece is placed;
a tool configured to machine the workpiece placed on the mounting table, the tool including the tip;
a shade detector fixed on the mounting table and configured to provide an optical path of a laser light and detect a shade state of the laser light; and
a tool controller connected to the mounting table via a pair of columns and configured to control an orientation and a position of the tool,
wherein a reference point associated with the tool is provided to the tool controller, and the method for correcting comprises:
a matching process in which the tool controller actually matches the tip of the tool with a measurement position of the laser light, while keeping a first orientation which is an orientation of the tool for machining, the matching being based on the first orientation and a length of the tool, the matching process comprising:
a first moving process in which the tool controller moves the tool in one axial direction while keeping the first orientation; and
a specifying process in which the tool controller specifies, in the first moving process:
a first reference point position that is a position of the reference point in a state in which the measurement position of the laser light is shaded in a first portion of the tool, and
the second reference point position that is a position of the reference point in a state in which the measurement position of the laser light is shaded in a second portion of the tool when the tool is moved in said axial direction; and
a first tool position specifying process in which the first tool position, which is a position of the reference point in a state in which the tip is actually matched with the measurement position of the laser light, is specified, the first tool position specifying process comprising:
a first process wherein the tool controller controls positioning of the tool such that the reference point is positioned on a straight line connecting the measurement position of the laser light and a central point of a line defined by the first reference point position and the second reference point position, while keeping the first orientation of the tool and moving the tool such that the reference point is positioned along the straight line while keeping the first orientation of the tool; and
a second process wherein the tool controller specifies a third reference point position that is the position of the reference point in a state in which the measurement position is shaded by the tip when the tool is moved along the straight line.

2. The method for correcting according to claim 1, further comprising:
a second tool position specifying process in which, when an orientation of the tool for machining is changed from the first orientation to a second orientation, the tool controller, based on the second orientation and the length of the tool, specifies a second tool position which is the position of the reference point in a state in which the tip of the tool is actually matched with the measurement position of the laser light, while keeping the second orientation, and
correcting the position of the tip in the second orientation of the tool based on a difference between the first tool position and the second tool position.

3. The method for correcting according to claim 1, further comprising:
- a second tool position specifying process in which, when the tool is exchanged for another tool, the tool controller, based on the first orientation and a length of the other tool, specifies a second tool position which is the position of the reference point in a state in which a tip of the other tool is actually matched with the measurement position of the laser light, while keeping the first orientation, and
- correcting the position of the tip in the first orientation of the other tool by the tool controller based on a difference between the first tool position and the second tool position.

* * * * *